US012330432B2

(12) United States Patent
Hiramatsu et al.

(10) Patent No.: US 12,330,432 B2
(45) Date of Patent: Jun. 17, 2025

(54) PRINT SYSTEM

(71) Applicant: BROTHER KOGYO KABUSHIKI KAISHA, Nagoya (JP)

(72) Inventors: Yuki Hiramatsu, Nukata (JP); Atsushi Fujioka, Nagoya (JP); Katsuma Torii, Nagoya (JP); Takuji Sakabe, Chita (JP); Hirokazu Miyabayashi, Nagoya (JP); Hiromasa Takahashi, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 23 days.

(21) Appl. No.: 18/048,632

(22) Filed: Oct. 21, 2022

(65) Prior Publication Data

US 2023/0131452 A1 Apr. 27, 2023

(30) Foreign Application Priority Data

Oct. 25, 2021 (JP) ................................ 2021-173810
Oct. 25, 2021 (JP) ................................ 2021-173813
Jun. 30, 2022 (JP) ................................ 2022-106222

(51) Int. Cl.

| | |
|---|---|
| ***B41J 23/02*** | (2006.01) |
| ***B41J 11/00*** | (2006.01) |
| ***B41J 29/13*** | (2006.01) |
| ***B41J 29/393*** | (2006.01) |
| ***G03G 15/00*** | (2006.01) |

(52) U.S. Cl.

CPC ........... *B41J 23/025* (2013.01); *B41J 11/007* (2013.01); *B41J 29/13* (2013.01); *B41J 29/393* (2013.01); *G03G 15/80* (2013.01); *B41J 2029/3932* (2013.01)

(58) Field of Classification Search

CPC ........ B41J 11/007; B41J 23/025; B41J 29/13; B41J 29/393; B41J 2029/3932; G03G 15/80

See application file for complete search history.

(56) References Cited

U.S. PATENT DOCUMENTS

| | | | | |
|---|---|---|---|---|
| 2002/0033872 | A1 | 3/2002 | Takahashi | |
| 2007/0211096 | A1 | 9/2007 | Narushima et al. | |
| 2017/0080721 | A1 | 3/2017 | Nohara et al. | |
| 2020/0099242 | A1 * | 3/2020 | Horita | B41J 29/393 |

FOREIGN PATENT DOCUMENTS

| | | | |
|---|---|---|---|
| JP | 2012125928 | A * | 7/2012 |
| JP | 5031933 | B2 * | 9/2012 |
| JP | 2017-56700 | A | 3/2017 |

OTHER PUBLICATIONS

Extended European Search Report for European Patent Application No. 22203443.1 (Feb. 22, 2023).

* cited by examiner

*Primary Examiner* — Christopher E Mahoney
*Assistant Examiner* — Marissa Ferguson-Samreth
(74) *Attorney, Agent, or Firm* — KENEALY VAIDYA LLP

(57) ABSTRACT

A print system includes a head, a conveyance motor, a first connector, and a second connector, a power supply circuit. When a first power source is connected to the first connector and a second power source is connected to the second connector, the power supply circuit supplies at least some of a first power to the head and supplies at least some of a second power to the conveyance motor. The first power is a power of the first power source. The second power is a power of the second power source.

30 Claims, 17 Drawing Sheets

FIG. 4

| USABILITY | | OPERATION MODE |
|---|---|---|
| AC ADAPTOR or USB POWER SUPPLY | BATTERY | |
| × | × | PRINTING NOT POSSIBLE |
| × | ○ | DRIVING USING SINGLE POWER SOURCE |
| ○ | × | |
| ○ | ○ | DRIVING USING MULTIPLE POWER SOURCES |

FIG. 8

Table T

| DRIVE METHOD | | DRIVING USING SINGLE POWER SOURCE | | DRIVING USING MULTIPLE POWER SOURCES | |
|---|---|---|---|---|---|
| | | AC ADAPTOR (USB POWER SUPPLY) | BATTERY | HIGH SPEED MODE | POWER SUPPRESSION MODE |
| TEMPERATURE t OF BATTERY | 40～50 | SPEED C | SPEED B | SPEED A | SPEED B |
| | 30～40 | SPEED C | SPEED B | SPEED A | SPEED B |
| | 20～30 | SPEED C | SPEED B | SPEED A | SPEED B |
| | 10～20 | SPEED C | SPEED C | SPEED B | SPEED C |
| | 0～10 | SPEED C | SPEED D | SPEED C | SPEED D |

PRINT SYSTEM

REFERENCE TO RELATED APPLICATIONS

This application claims priority from Japanese Patent Application No. 2022-106222 filed on Jun. 30, 2022, which claims priority to Japanese Patent Application No. 2021-173810 filed on Oct. 25, 2021, Japanese Patent Application No. 2021-173810 filed on Oct. 25, 2021, and Japanese Patent Application No. 2021-173813 filed on Oct. 25, 2021. The entire content of the priority application is incorporated herein by reference.

BACKGROUND ART

The present disclosure relates to a print system.

A printer is known that is driven by a power source supply from a battery or an external power supply device. When both the battery and the external power supply device are connected to the printer, the printer is driven by power supplied from the external power supply device. When both the battery and the external power supply device are connected to the printer, and the printer performs printing, the printer is driven by power supplied from the battery.

DESCRIPTION

In the above-described printer, when a large amount of power is required in order to perform the printing at a higher speed, it is necessary to increase the size of the power source, such as the battery or the like. Thus, there is a possibility that the printer may increase in size.

Various embodiments of the general principles described herein provide a print system capable of suppressing an increase in size.

A first aspect of the present disclosure relates to a print system configured to be driven by a plurality of power sources. The print system includes a head, a conveyance motor, a first connector, a second connector, and a power supply. The head is configured to perform printing on a medium. The conveyance motor is configured to generate motive power to convey the medium. The first connector is configured to connect a first power source. The second connector is configured to connect a second power source. The power supply circuit is configured to supply power to the head and to the conveyance motor. When the first power source is connected to the first connector and the second power source is connected to the second connector, the power supply circuit supplies at least some of a first power to the head and supplies at least some of a second power to the conveyance motor. The first power is a power of the first power source. The second power is a power of the second power source.

The print system supplies the first power of the first power source to the head, and supplies the second power to the conveyance motor. Thus, the power supplied from the plurality of power sources can be efficiently used. As a result, it is not necessary for the print system to increase the size of each of the power sources to drive the head and the conveyance motor. Thus, the print system can suppress an increase in size.

A second aspect of the present disclosure relates to a print system configured to be driven by a plurality of power sources. The print system includes a head, a conveyance motor, a first connector, a second connector, a power supply circuit. The head is configured to perform printing on a medium. The conveyance motor is configured to generate motive power to convey the medium. The first connector is configured to connect a first power source. The second connector is configured to connect a second power source. The power supply circuit is configured to supply power to the head and to the conveyance motor. When the first power source is connected to the first connector and the second power source is connected to the second connector, based on power consumed by the head and the conveyance motor, the power supply circuit supplies one of at least some of a first power or at least some of a second power to one of the head or the conveyance motor. The first power is a power of the first power source. The second power is a power of the second power source. Based on the power consumed by the head and the conveyance motor, the power supply circuit supplies the other of the at least some of the first power or the at least some of the second power to the other of the head or the conveyance motor.

Based on the power consumed by the head and the conveyance motor, the print system can efficiently supply the first power of the first power source and the second power of the second power source to each of the head and the conveyance motor. Thus, the print system does not need to increase the size of each of the power sources to drive the head and the conveyance motor. As a result, the print system can suppress an increase in size.

FIG. 4 is a table showing a drive pattern of a head and a conveyance motor.

FIG. 8 is a table showing a relationship between a power source connected to the printer and a print speed.

A printer 1 according to an embodiment of the present disclosure will be described with reference to the drawings. Hereinafter, the lower left direction, the upper right direction, the upper left direction, the lower right direction, the upper direction, and the lower direction in FIG. 1 respectively correspond to the front direction, the rear direction, the left direction, the right direction, the upper direction and the lower direction of the printer 1.

Figure 1:
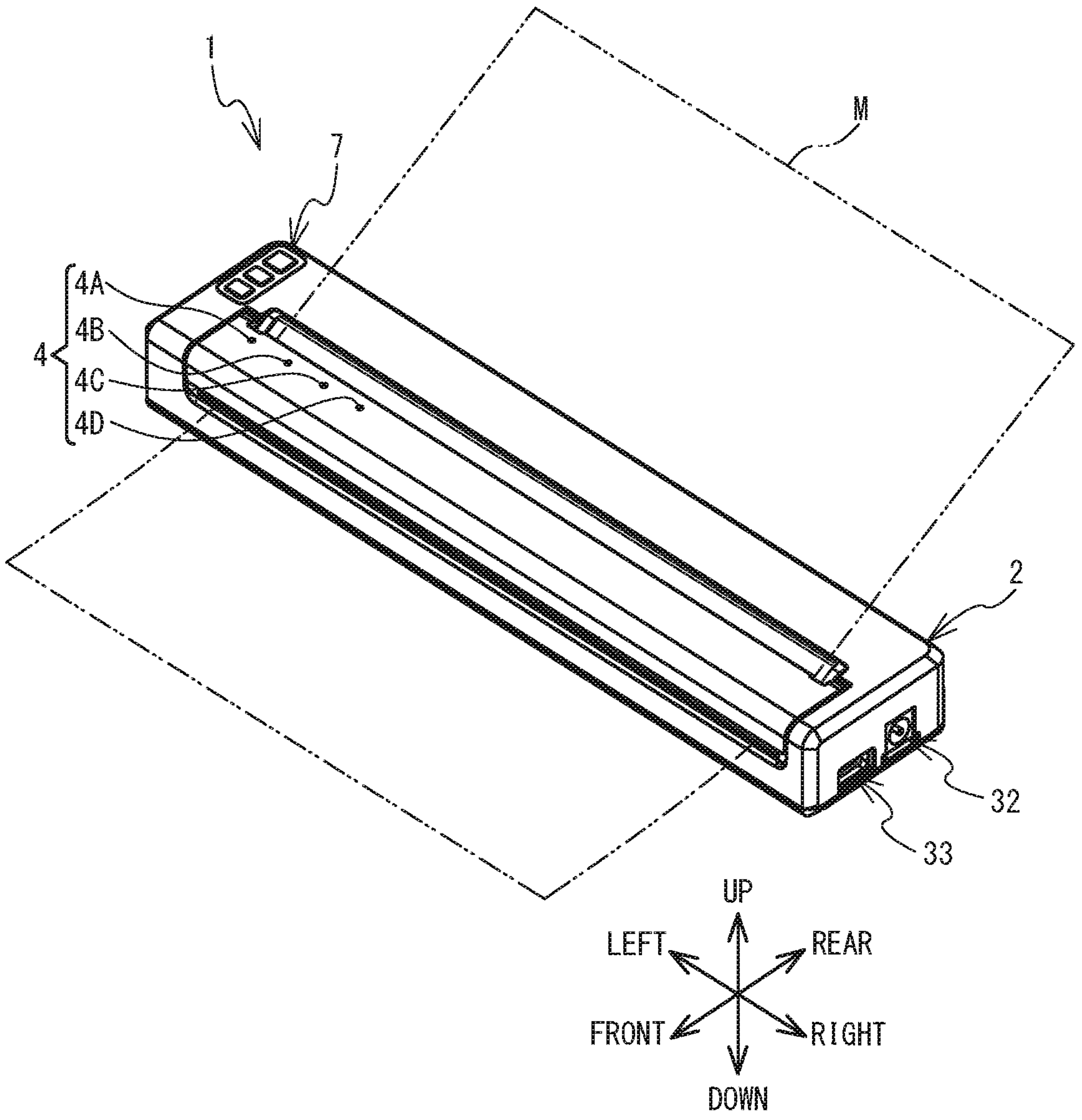
FIG. 1 is a perspective view of a printer.
Figure 2:
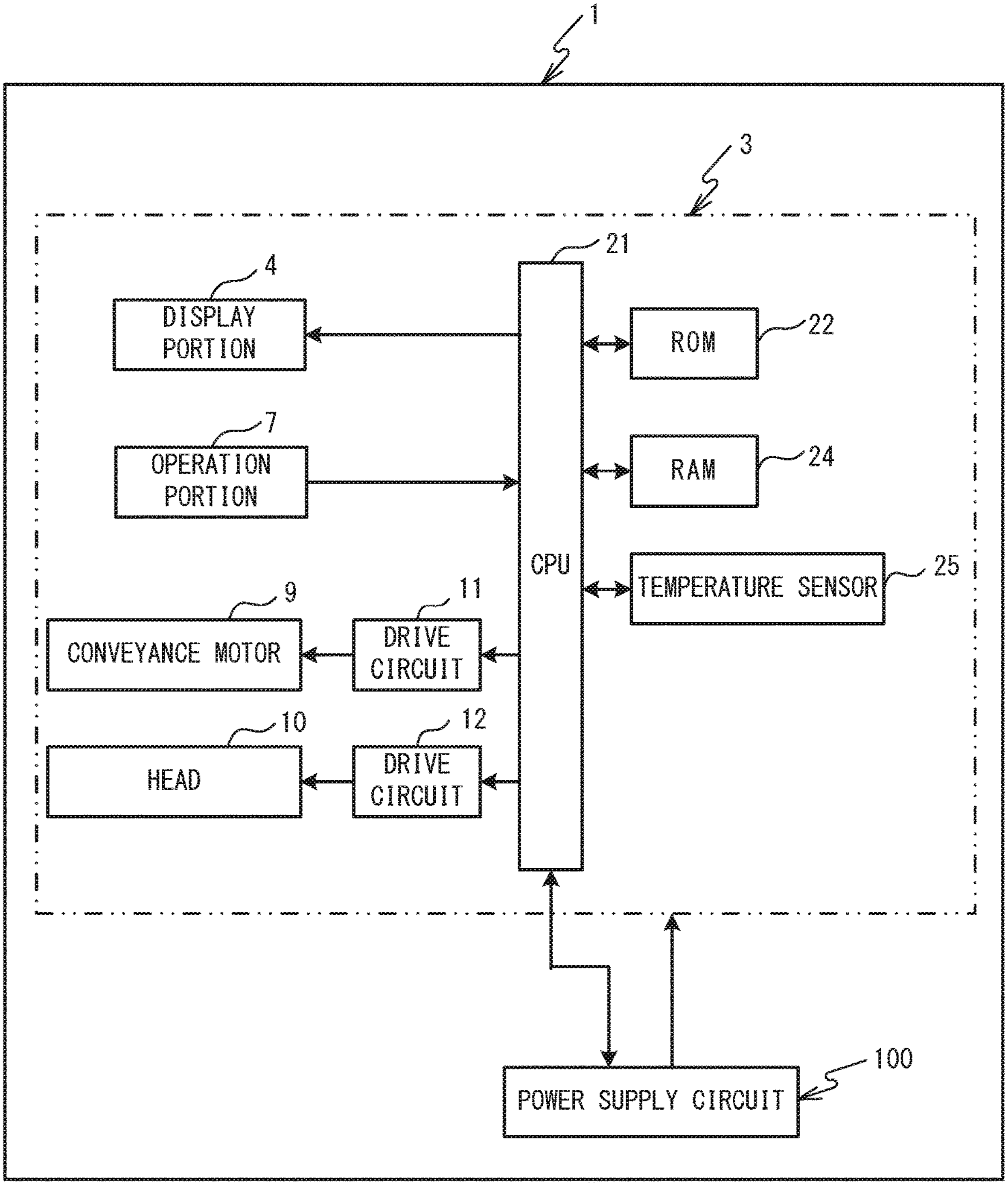
FIG. 2 is a diagram showing an electrical configuration of the printer.

The printer 1 shown in FIG. 1 and FIG. 2 can be driven by a plurality of power sources. The plurality of power sources includes a battery 29, an AC adaptor 30, and a USB power supply 31. Note that, in the printer 1, it is assumed that the AC adaptor 30 and the USB power supply 31 are not used simultaneously. The printer 1 prints an image on a medium M on the basis of print data. A material of the medium M is not particularly limited, and is, for example, a sheet shape or a tape shape, and in the present embodiment, is a heat-sensitive cut paper.

As shown in FIG. 1, the printer 1 is provided with a case 2. The case 2 is a cuboid shape, and is longer in the left-right direction than in the front-rear direction and the up-down direction. A battery mount 34 (refer to FIG. 5) is provided at the rear lower portion of the case 2. The battery 29 can be connected to the battery mount 34.

An AC adaptor jack 32 and a USB jack 33 are provided at a right end portion of the case 2. The USB jack 33 is provided to the front of the AC adaptor jack 32. The AC adaptor 30 (refer to FIG. 5) that is an external power source can be connected to the AC adaptor jack 32. The USB power supply 31 (refer to FIG. 5) that is an external power source can be connected to the USB jack 33.

An operation portion 7 is provided at the left end portion of the case 2. The operation portion 7 is a physical button for inputting various commands. It is sufficient that the various commands can be input to the operation portion 7, and the operation portion 7 may be configured by a dial, a touch panel, or the like.

A display portion 4 is provided at the left end and front end portion of the printer 1. The display portion 4 can display various information. The display portion 4 is a plurality of LEDs 4A to 4D. The plurality of LEDs 4A to 4D is aligned in the left-right direction.

The electrical configuration of the printer 1 will be described with reference to FIG. 2. The printer 1 is provided with a power supply circuit 100, and a print portion 3. The power supply circuit 100 supplies respective power from the battery 29 (refer to FIG. 3 and FIG. 5), the AC adaptor 30 (refer to FIG. 3 and FIG. 5), and the USB power supply 31 (refer to FIG. 3 and FIG. 5) to the print portion 3. The power supplied from the battery 29 will be referred to as a first power. The power supplied from the AC adaptor 30 will be referred to as a second power. The power supplied from the USB power supply 31 will be referred to as a third power. Note that the first power is greater than the second power. Further, the second power is greater than the third power.

The battery 29 can output a voltage of 10.8V. The AC adaptor 30 can output a voltage of 15V. The USB power supply 31 can output a voltage of 15V. The USB power supply 31 is a so-called "USB Power Delivery.

The print portion 3 is provided with a CPU 21, a ROM 22, a RAM 24, drive circuits 11 and 12, a conveyance motor 9, a thermal head (hereinafter referred to as a "head 10"), a temperature sensor 25, the operation portion 7, and the display portion 4.

Each of the ROM 22, the RAM 24, the temperature sensor 25, the operation portion 7, the display portion 4, and the drive circuits 11 and 12 is electrically connected to the CPU 21. Various programs required for control of the printer 1 are stored in the ROM 22. The CPU 21 performs various arithmetic calculations on the basis of these programs. Storage areas are provided in the RAM 24. Various arithmetic data are stored in the storage areas.

The temperature sensor 25 is provided at the battery mount 34. The temperature sensor 25 detects a temperature t of the battery 29. The temperature sensor 25 is connected to the CPU 21, and transmits a detection result of the temperature t of the battery 29 to the CPU 21. The operation portion 7 is connected to the CPU 21 and transmits various commands to the CPU 21. The display portion 4 is connected to the CPU 21 and displays various information.

The conveyance motor 9 is connected to the drive circuit 11. The conveyance motor 9 is provided inside the case 2. The conveyance motor 9 generates power for conveying the medium M. The conveyance motor 9 conveys the medium M as a result of the driving of the drive circuit 11.

The head 10 is connected to the drive circuit 12. The head 10 is provided inside the case 2. The head 10 performs printing on the medium M. The head 10 includes a plurality of heating elements. The head 10 selectively heats the plurality of heating elements using the driving of the drive circuit 12. The CPU 21 performs the printing on the medium M by driving each of the conveyance motor 9 and the head 10, using the drive circuits 11 and 12.

Figure 3:
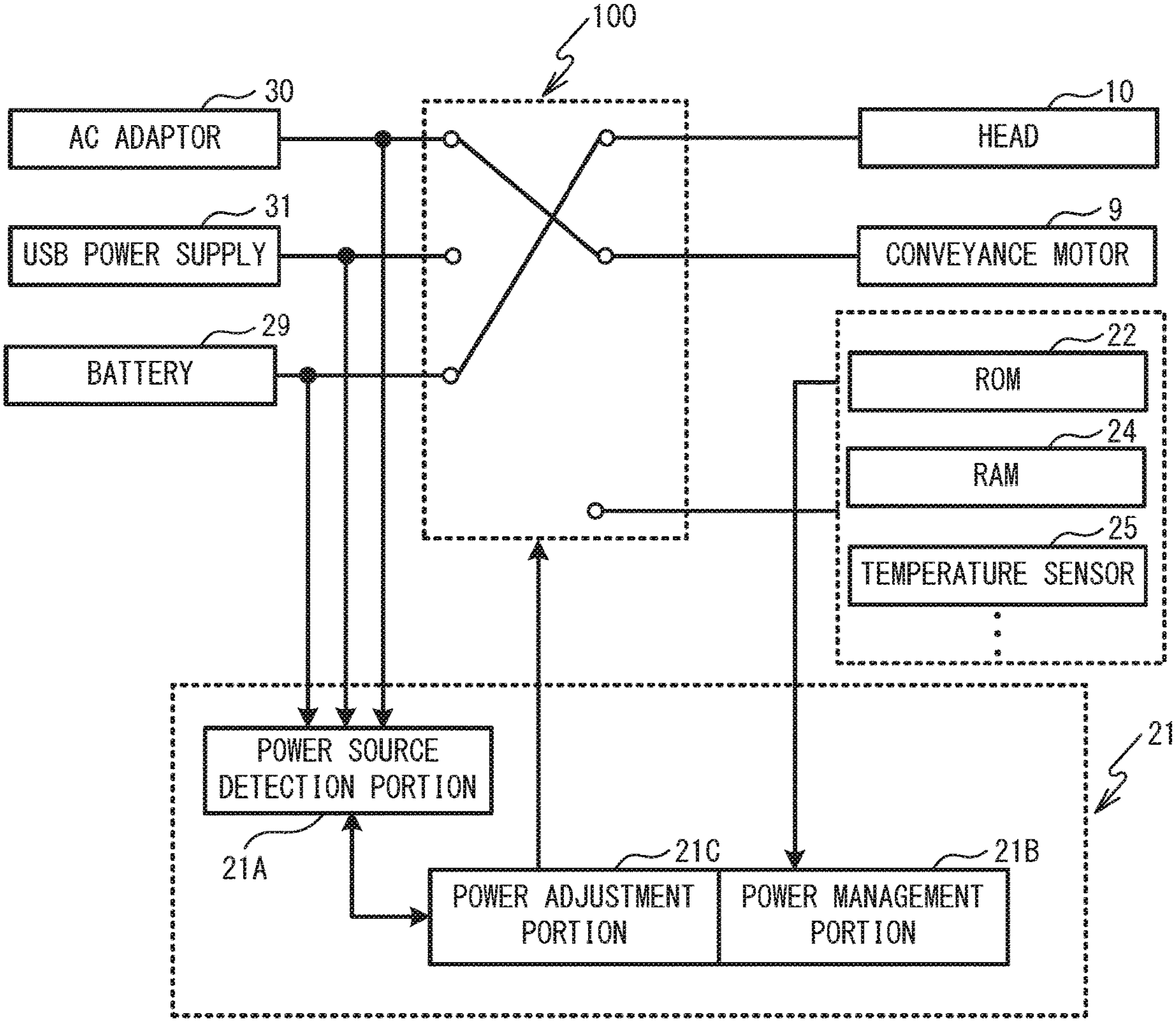
FIG. 3 is a block diagram showing a power source detection portion, a power management portion, and a power adjustment portion of the printer.

A power source detection portion 21A, a power management portion 21B, and a power adjustment portion 21C of the CPU 21 will be described with reference to FIG. 3. The power source detection portion 21A detects whether, of the AC adaptor 30, the USB power supply 31, and the battery 29, a usable power source is connected. The power source detection portion 21A detects the respective voltages of the AC adaptor 30, the USB power supply 31, and the battery 29. An analog digital converter (ADC) is used for the detection of the voltages.

When the voltage output from the AC adaptor 30 is equal to or greater than a second threshold value, the power source detection portion 21A determines that the AC adaptor 30 is the usable power source. The second threshold value is 13V, for example. A first threshold value will be described later. Further, when the voltage output from the USB power supply 31 is equal to or greater than a third threshold value, the power source detection portion 21A determines that the USB power supply 31 is the usable power source. The third threshold value is 11V, for example.

When the voltage output from the battery 29 is equal to or greater than the first threshold value, the power source detection portion 21A determines that the battery 29 is the usable power source. Further, when the voltage output from the battery 29 is smaller than the first threshold value, the CPU 21 determines that the battery 29 cannot be used.

The first threshold value includes a fourth threshold value and a fifth threshold value. The fifth threshold value is greater than the fourth threshold value. The fourth threshold value is 8V, for example. The fifth threshold value is 9V, for example. When, of the plurality of power sources, the power source other than the battery 29 (the AC adaptor 30, the USB power supply 31) cannot be used, and the voltage output from the battery 29 is equal to or greater than the fourth threshold value, the power source detection portion 21A determines that the battery 29 is the usable power source. In other words, when the power source other than the battery 29 (the AC adaptor 30 or the USB power supply 31) cannot be used, the power source detection portion 21A uses the fourth threshold value.

When, of the plurality of power sources, the power source other than the battery 29 (the AC adaptor 30, the USB power supply 31) can be used, and the voltage output from the battery 29 is equal to or greater than the fifth threshold value, the power source detection portion 21A determines that the battery 29 is the usable power source. In other words, when the power source other than the battery 29 (the AC adaptor 30 or the USB power supply 31) can be used, the power source detection portion 21A uses the fifth threshold value.

The power management portion 21B manages the power required for printing by the head 10 and the conveyance motor 9, based on print data stored in the ROM 22 and the RAM 24. The power required by the head 10 is calculated on the basis of data such as a number of on dots per line. The power required by the conveyance motor 9 is calculated on the basis of data such as a conveyance speed, a conveyance amount, and the like at the time of printing.

The power adjustment portion 21C decides a supply destination of each of the power sources, in accordance with the detection result of the power source detection portion 21A, and a calculation result of the power management portion 21B. The power adjustment portion 21C controls the power supply circuit 100 to be described later, and switches the supply destination of the power of each of the power sources. Note that some of the power of any of the power sources connected to the printer 1 may be supplied to the CPU 21, the ROM 22, the RAM 24, the temperature sensor 25, and the like.

The power adjustment portion 21C supplies the power of the usable power source to the head 10 and the conveyance motor 9. For example, when it is determined that only one of the power sources, of the battery 29, the AC adaptor 30, and the USB power supply 31, can be used, the CPU 21 supplies the power of the one power source to the head 10 and the conveyance motor 9. For example, when only the battery 29 can be used, at least some of the first power of the battery 29 is supplied to the head 10 and the conveyance motor 9.

On the other hand, when it is determined that the both the battery 29 and the AC adaptor 30 can be used, for example, the power adjustment portion 21C supplies at least some of the first power, which is the power of the battery 29 connected to the battery mount 34, to the head 10. In this case, the power adjustment portion 21C supplies at least some of the second power, which is the power of the AC adaptor 30 connected to the AC adaptor jack 32, to the conveyance motor 9.

A drive pattern of the printer 1 will be described with reference to FIG. 4. When it is determined that both the AC adaptor 30 (the USB power supply 31) and the battery 29 cannot be used, the printer 1 cannot perform the printing. When it is determined that the AC adaptor 30 (the USB power supply 31) cannot be used, and only the battery 29 can be used, the printer 1 performs the driving using the single power source of the battery 29 only.

When the AC adaptor 30 (the USB power supply 31) can be used, and the battery 29 cannot be used, the printer 1 performs the driving using the single power source of the AC adaptor 30 (the USB power supply 31) only. When both the AC adaptor 30 (the USB power supply 31) and the battery 29 can be used, the printer 1 performs the driving using the plurality of power sources.

Figure 5:
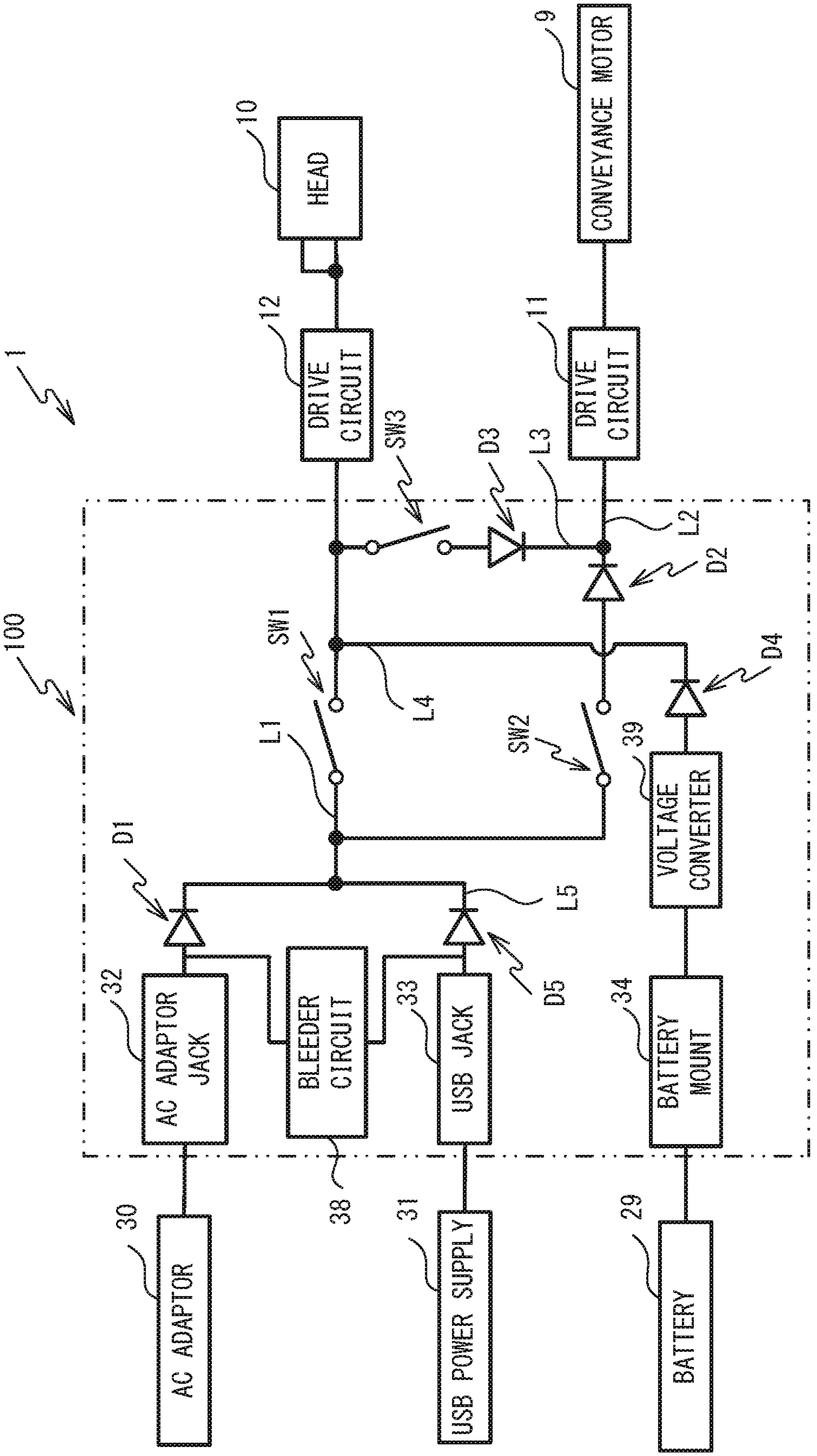
FIG. 5 is a circuit diagram showing a power supply circuit.

The power supply circuit 100 will be described with reference to FIG. 5. The power supply circuit 100 supplies power to the head 10 and the conveyance motor 9, on the basis of the power of one of the battery 29, the AC adaptor 30, and the USB power supply 31. In other words, the power supply circuit 100 supplies, to the head 10 and the conveyance motor 9, the first power that is the power of the battery 29, the second power that is the power of the AC adaptor 30, and the third power that is the power of the USB power supply 31.

The power supply circuit 100 is provided with the AC adaptor jack 32, the USB jack 33, the battery mount 34, a voltage converter 39, wiring lines L1 to L5, switches SW1 to SW3, and a bleeder circuits 38.

The AC adaptor jack 32 is electrically connected to an anode of a diode D1. The cathode of the diode D1 is electrically connected to the first switch SW1. The first switch SW1 is an electronic device, for example a transistor, that can switch a on-off state itself. The first switch SW1 is electrically connected to the drive circuit 12. The drive circuit 12 is electrically connected to the head 10. Hereinafter, the wiring line electrically connecting the AC adaptor jack 32 and the head 10 will be referred to as the "first wiring line L1." The first switch SW1 switches the first wiring line L1 between a conduction state and a non-conduction state.

The second switch SW2 is electrically connected to the first wiring line L1, between the cathode of the diode D1 and the first switch SW1. The second switch SW2 is connected to the anode of a diode D2. The second switch SW2 is an electronic device, for example a transistor, that can switch a on-off state itself. The cathode of the diode D2 is electrically connected to the drive circuit 11. The drive circuit 11 is electrically connected to the conveyance motor 9. Hereinafter, the wiring line electrically connecting the AC adaptor jack 32 and the conveyance motor 9 will be referred to as the "second wiring line L2." The second switch SW2 switches the second wiring line L2 between a conduction state and a non-conduction state.

The third switch SW3 is electrically connected to the first wiring line L1, between the first switch SW1 and the drive circuit 12. The third switch SW3 is an electronic device, for example a transistor, that can switch on-off state itself. The third switch W3 is connected to the anode of a diode D3. The cathode of the diode D3 is electrically connected to the second wiring line L2, between the second switch SW2 and the drive circuit 11. Hereinafter, the wiring line forming an electrical connection between the first wiring line L1 between the first switch SW1 and the drive circuit 12, and the second wiring line L2 between the second switch SW2 and the drive circuit 11 will be referred to as the "third wiring line L3." The third switch SW3 switches the third wiring line L3 between a conduction state and a non-conduction state.

The battery mount 34 is connected to the voltage converter 39. The voltage converter 39 boosts the voltage of the battery 29 to 15V. The voltage converter 39 is connected to the anode of a diode D4. The cathode of the diode D4 is electrically connected to the first wiring line L1, between the first switch SW1 and the drive circuit 12. Hereinafter, the wiring line connected to the battery 29 and forming an electrical connection to the first wiring line L1 between the first switch SW1 and the drive circuit 12 will be referred to as the "fourth wiring line L4."

The USB jack 33 can connect the USB power supply 31. The USB jack 33 is connected to the anode of a diode D5. The cathode of the diode D5 is electrically connected to the first wiring line L1, between the first switch SW1 and the cathode of the diode D1. Hereinafter, the wiring line connected to the USB jack 33 and forming an electrical connection to the first wiring line L1 between the AC adaptor jack 32 and the first switch SW1 will be referred to as the "fifth wiring line L5."

The driving using the single power source of the battery 29 will be described. In this case, the AC adaptor 30 and the USB power supply 31 are not connected to the AC adaptor jack 32 and the USB jack 33. The power adjustment portion 21C switches the third switch SW3 on, and switches the first switch SW1 and the second switch SW2 off. In this way, at least some of the first power of the battery 29 is supplied to the head 10 via the fourth wiring line L4 and the first wiring line L1. Further, at least some of the first power of the battery 29 is supplied to the conveyance motor 9 via the fourth wiring line L4, the first wiring line L1, the third wiring line L3, and the second wiring line L2. In other words, when the battery 29 is connected to the battery mount 34 and the AC adaptor 30 is not connected to the AC adaptor jack 32, the power supply circuit 100 supplies at least some of the first power to the head 10 and the conveyance motor 9.

The driving using the single power source of the AC adaptor 30 will be described. In this case, the battery 29 and the USB power supply 31 are not connected to the battery mount 34 and the USB jack 33. The power adjustment portion 21C switches the first switch SW1 and the second switch SW2 on, and switches the third switch SW3 off. In this way, at least some of the second power of the AC adaptor 30 is supplied to the head 10 via the first wiring line L1. Further, at least some of the second power of the AC adaptor 30 is supplied to the conveyance motor 9 via the second wiring line L2. In other words, when the AC adaptor 30 is connected to the AC adaptor jack 32, and the battery 29 is not connected to the battery mount 34, the power supply circuit 100 supplies at least some of the second power to the head 10 and the conveyance motor 9.

The driving using the single power source of the USB power supply 31 will be described. In this case, the battery 29 and the AC adaptor 30 are not connected to the battery mount 34 and the AC adaptor jack 32. The power adjustment portion 21C switches the first switch SW1 and the second switch SW2 on, and switches the third switch SW3 off. In this way, at least some of the third power of the USB power supply 31 is supplied to the head 10 via the fifth wiring line and the first wiring line L1. Further, at least some of the third power of the USB power supply 31 is supplied to the conveyance motor 9 via the fifth wiring line and the second wiring line L2.

The driving using the plurality of power sources of the battery 29 and the AC adaptor 30 will be described. In this case, it does not matter whether or not the USB power supply 31 is connected. For example, when the AC adaptor 30 and the USB power supply 31 are simultaneously connected to the printer 1, it is sufficient that the use of the AC adaptor 30 is prioritized. The power adjustment portion 21C switches the second switch SW2 on, and switches the first switch SW1 and the third switch SW3 off. In this way, at least some of the first power of the battery 29 is supplied to the head 10 only, via the fourth wiring line L4 and the first wiring line L1. Further, at least some of the second power of the AC adaptor 30 is supplied to the conveyance motor 9 only, via the second wiring line L2. In other words, when the battery 29 is connected to the battery mount 34, and the AC adaptor 30 is connected to the AC adaptor jack 32, the power supply circuit 100 supplies at least some of the first power to the head 10 and supplies at least some of the second power to the conveyance motor 9.

The driving using the plurality of power sources of the battery 29 and the USB power supply 31 will be described. In this case, the AC adaptor 30 is not connected to the AC adaptor jack 32. The power adjustment portion 21C switches the second switch SW2 on, and switches the first switch SW1 and the third switch SW3 off. In this way, at least some of the first power of the battery 29 is supplied to the head 10 only, via the fourth wiring line L4 and the first wiring line L1. Further, at least some of the third power of the USB power supply 31 is supplied to the conveyance motor 9 only, via the fifth wiring line L5 and the second wiring line L2. In other words, when the battery 29 is connected to the battery mount 34, and the USB power supply 31 is connected to the USB jack 33, the power supply circuit 100 supplies at least some of the first power to the head 10 and supplies at least some of the third power to the conveyance motor 9.

As described above, when the driving is performed using the plurality of power sources, the power supply circuit 100 simultaneously supplies at least some of the first power to the head 10 and supplies at least some of the second power or the third power to the conveyance motor 9.

Figure 6:
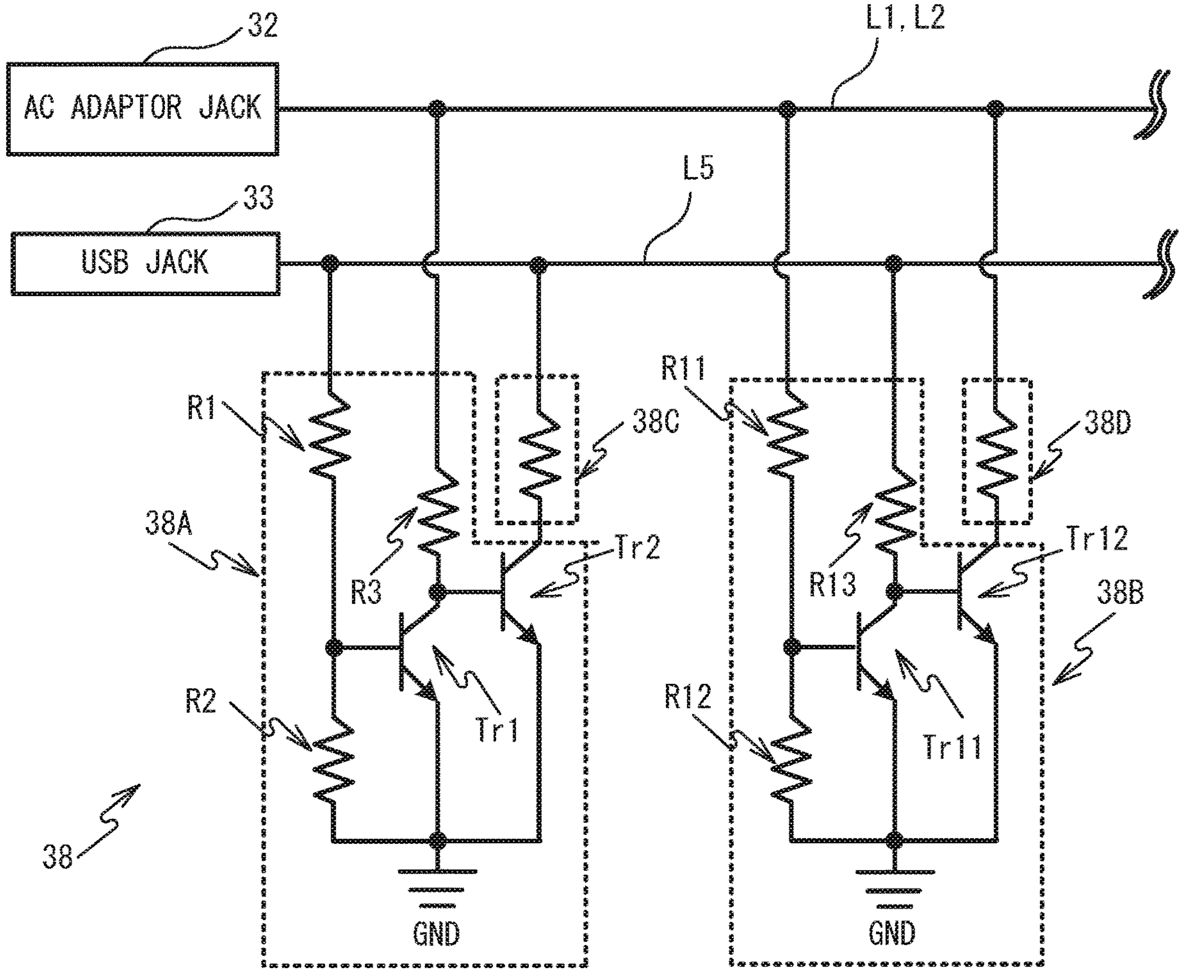
FIG. 6 is a diagram showing a first bleeder circuit, a second bleeder circuit, a first bleeder resistor, and a second bleeder resistor.

The bleeder circuit 38 will be described with reference to FIG. 6. The bleeder circuit 38 includes a first bleeder circuit 38A, a first bleeder resistor 38C, a second bleeder circuit 38B, and a second bleeder resistor 38D.

The first bleeder circuit 38A discharges an electric charge generated in the USB jack 33 to which the USB power supply 31 is not connected. The first bleeder circuit 38A is provided with resistors R1 to R3, and transistors Tr1 and Tr2. One end of the resistor R1 is electrically connected to the fifth wiring line L5. The other end of the resistor R1 is electrically connected to one end of the resistor R2. The other end of the resistor R2 is electrically connected to a ground GND. One end of the resistor R3 is electrically connected to the first wiring line L1.

A base of the transistor Tr1 is electrically connected to the one end of the resistor R2. A collector of the transistor Tr1 is electrically connected to the other end of the resistor R3. An emitter of the transistor Tr1 is electrically connected to the ground GND.

A base of the transistor Tr2 is electrically connected to the other end of the resistor R3 and to the collector of the transistor Tr1. An emitter of the transistor Tr2 is electrically connected to the ground GND. A collector of the transistor Tr2 is connected to one end of the first bleeder resistor 38C. The other end of the first bleeder resistor 38C is connected to the fifth wiring line L5. In other words, the first bleeder circuit 38A is connected to the first wiring line L1, the fifth wiring line L5, and the ground GND. Further, the first bleeder resistor 38C is connected to the first bleeder circuit 38A, and to the fifth wiring line L5.

The second bleeder circuit 38B discharges an electric charge generated in the AC adaptor jack 32 to which the AC adaptor 30 is not connected. The second bleeder circuit 38B is provided with resistors R11 to R13, and transistors Tr11 and Tr12. One end of the resistor R11 is electrically connected to the first wiring line L1. The other end of the resistor R11 is electrically connected to one end of the resistor R12. The other end of the resistor R12 is electrically connected to a ground GND. One end of the resistor R13 is electrically connected to the fifth wiring line L5.

A base of the transistor Tr11 is electrically connected to the one end of the resistor R12. A collector of the transistor Tr11 is electrically connected to the other end of the resistor R13. An emitter of the transistor Tr11 is electrically connected to the ground GND.

A base of the transistor Tr12 is electrically connected to the other end of the resistor R13 and to the collector of the transistor Tr11. An emitter of the transistor Tr12 is electrically connected to the ground GND. A collector of the transistor Tr12 is connected to one end of the second bleeder resistor 38D. The other end of the second bleeder resistor 38D is connected to the first wiring line L1. In other words, the second bleeder circuit 38B is connected to the first wiring line L1, the fifth wiring line L5, and the ground GND. Further, the second bleeder resistor 38D is connected to the second bleeder circuit 38B, and to the first wiring line L1.

A case will be described in which the AC adaptor 30 is connected to the AC adaptor jack 32, and the USB power supply 31 is not connected to the USB jack 33. In this case, since there is not the supply of power from the USB jack 33, the transistor Tr1 is in an off state. On the other hand, since there is the supply of power from the AC adaptor jack 32, the transistor Tr2 is in an on state.

Here, when an electric charge has accumulated in the fifth wiring line L5, the first bleeder circuit 38A discharges the electric charge to the ground GND via the resistors R1 and R2. In this case, an electric charge that is not fully discharged by the first bleeder circuit 38A sometimes remains in the fifth wiring line L5. The electric charge remaining in the fifth wiring line L5 is discharged to the ground GND via the first bleeder resistor 38C and the transistor Tr2. In this way, the first bleeder circuit 38A and the first bleeder resistor 38C can suppress a voltage from being generated in the USB jack 33 to which the USB power supply 31 is not connected, and in the fifth wiring line L5.

A case will be described in which the USB power supply 31 is connected to the USB jack 33 and the AC adaptor 30 is not connected to the AC adaptor jack 32. In this case, since there is not the supply of power from the AC adaptor 30, the transistor Tr11 is in an off state. On the other hand, since there is the supply of power from the USB power supply 31, the transistor Tr12 is in an on state.

Here, when an electric charge has accumulated in the first wiring line L1, the second bleeder circuit 38B discharges the electric charge to the ground GND via the resistors R11 and R12. In this case, an electric charge that is not fully discharged by the second bleeder circuit 38B sometimes remains in the first wiring line L1. The electric charge remaining in the first wiring line L1 is discharged to the ground GND via the second bleeder resistor 38D and the transistor Tr12. In this way, the second bleeder circuit 38B and the second bleeder resistor 38D can suppress a voltage from being generated in the AC adaptor jack 32 to which the AC adaptor 30 is not connected, and in the first wiring line L1.

The display portion 4 will be described with reference to FIG. 7. The display portion 4 displays information indicating which of the AC adaptor 30, the USB power supply 31, and the battery 29 is being used as the power source. A display format of the display portion 4 includes a first mode (refer to FIG. 7A to FIG. 7C) and a second mode (refer to FIGS. 7D and 7E). Each of the modes may be set in advance by a user.

Figure 7A:
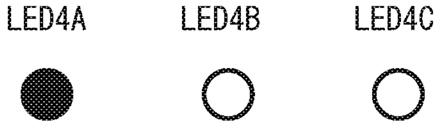
FIG. 7A to FIG. 7E are diagrams showing illumination patterns of LEDs.
Figure 7B:
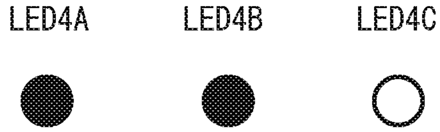
Figure 7C:
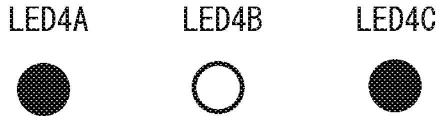

As shown in FIG. 7A to FIG. 7C, in the first mode, the LEDs 4A to 4C are used. For example, the battery 29 corresponds to the LED 4A. When the battery 29 is used, the LED 4A is illuminated. The AC adaptor 30 corresponds to the LED 4B. When the AC adaptor 30 is used, the LED 4B is illuminated. The USB power supply 31 corresponds to the LED 4C. When the USB power supply 31 is used, the LED 4C is illuminated.

For example, when the printer 1 performs the driving using the single power source of the battery 29, only the LED 4A is illuminated (refer to FIG. 7A). For example, when the printer 1 performs the driving using the plurality of power sources of the battery 29 and the AC adaptor 30, the LED 4A and the LED 4B are illuminated (refer to FIG. 7B). For example, when the printer 1 performs the driving using the plurality of power sources of the battery 29 and the USB power supply 31, the LED 4A and the LED 4C are illuminated (refer to FIG. 7C). In other words, the display portion 4 is configured by the plurality of LEDs 4A to 4C provided corresponding to the plurality of power sources, and the plurality of LEDs 4A to 4C are illuminated in correspondence to the power source being used.

Figure 7D:
Figure 7E:
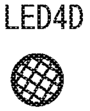

As shown in FIG. 7D and FIG. 7E, in the second mode, only the LED 4D is used. For example, the LED 4D can generate a plurality of colors, in accordance with the power source that is being used. Of the plurality of colors, the LED 4D is illuminated in the color corresponding to the power source being used. For example, when the printer 1 performs the driving using the single power source of the battery 29, the LED 4D is illuminated in red. Further, when the driving is performed using the plurality of power sources of the battery 29 and the AC adaptor 30, the LED 4D is illuminated in blue.

A print speed will be described with reference to a table T in FIG. 8. The table T is stored in the ROM 22 or the like, for example. The print speed of the printer 1 is decided on the basis of various conditions. The various conditions include the type of the power source driving the printer 1 (the battery 29, the AC adaptor 30, the USB power supply 31), the temperature t detected by the temperature sensor 25, the presence/absence of a setting for a high speed mode and a power suppression mode, and the like.

As the print speed, for example, one of a speed A to a speed D is set. The speed A is highest speed, and is 90 [mm/sec], for example. The speed B is 45 [mm/sec], for example. The speed C is 30 [mm/sec], for example. The speed D is a slowest speed, and is 22 [mm/sec], for example.

When the driving is performed using the single power source of the AC adaptor 30, the print speed is set to the speed C, for example. The print speed is constant, regardless of the other conditions. Note that when the driving is performed using the single power source of the USB power supply 31 also, the print speed is set in the same way as when the AC adaptor 30 is used.

When the driving is performed using the single power source of the battery 29, the print speed is decided on the basis of the detected temperature t of the battery 29. Further, the first power of the battery 29 is larger than the second power of the AC adaptor 30, and thus, a higher speed is set than when the driving is performed using the single power source of the AC adaptor 30. When the temperature t of the battery 29 is equal to or greater than 20° C. and less than 50° C., the print speed is set to the speed B.

Under low temperature conditions, the first power, which is the power that can be supplied by the battery 29, becomes smaller. Thus, the lower the temperature t of the battery 29, the slower the printer 1 makes the print speed. When the temperature t of the battery 29 is equal to or greater than 10° C. and less than 20° C., the print speed is set to the speed C. This speed is the same as when the AC adaptor 30 is used. Further, when the temperature t of the battery 29 is equal to or greater than 0° C. and less than 10° C., the print speed is set to the slowest speed, namely, the speed D. This speed is slower than the speed C for the AC adaptor 30.

When the driving is performed using the plurality of power sources of the battery 29 and the AC adaptor 30 (the USB power supply 31), the printer 1 is driven in the high speed mode or the power suppression mode, depending on a selection by the user. For example, the printer 1 is set to the high speed mode at the time of activation of the printer 1, and after that, the user sets the printer 1 to the power suppression mode.

In the high speed mode, the printer 1 can set the print speed to a higher speed than when the driving is performed using the single power source of the battery 29. When the temperature t of the battery 29 is equal to or greater than 0° C. and less than 10° C., the print speed is set to the speed C. When the temperature t of the battery 29 is equal to or greater than 10° C. and less than 20° C., the print speed is set to the speed B. When the temperature t of the battery 29 is equal to or greater than 20° C. and less than 50° C., the print speed is set to the speed A.

In the driving using the plurality of power sources, the power suppression mode is a mode in which the setting is made by the user to lengthen the life of the battery 29. When the power suppression mode is executed, the print speed is caused to be slower than in the high speed mode. In this case, the printer 1 restricts the number of on dots for which the heating elements of the head 10 can be simultaneously heated to a smaller number of dots than in the case of the high speed mode. In this way, the printer 1 can suppress power consumption. For example, in the power suppression mode, on the basis of the temperature t of the battery 29, the speed (the speed B to the speed D) is set to the same speed as at the time of performing the driving using the single power source of the battery 29. In other words, by switching between the high speed mode and the power suppression mode, the printer 1 can decide the print speed such that the print speed when performing the driving using the plurality of power sources is faster than, or is the same as when performing the driving using the single power source of the battery 29.

Figure 9:
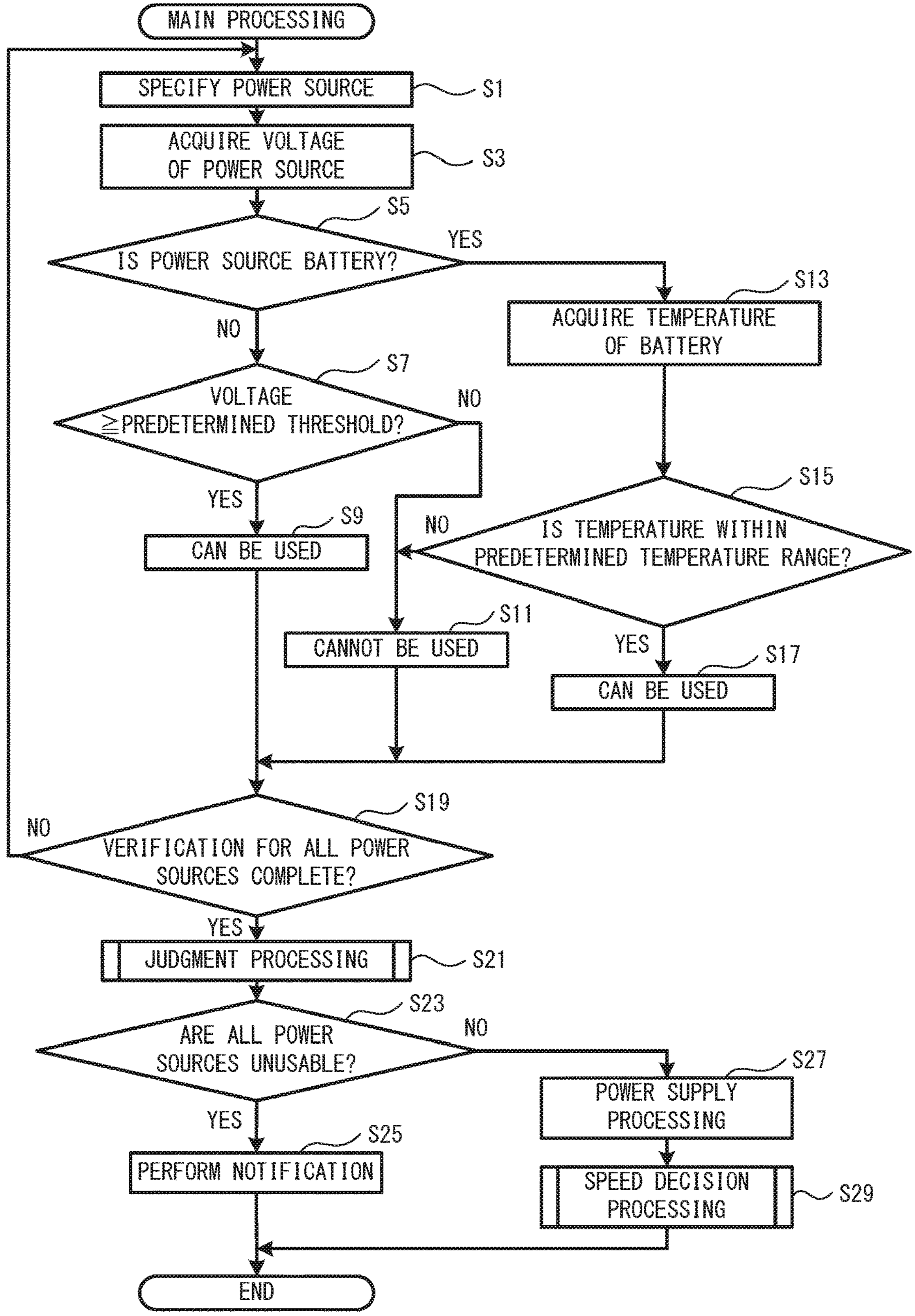
FIG. 9 is a flowchart showing main processing.

Main processing will be described with reference to FIG. 9. First, the power source is connected to the printer 1 by the user. In this state, as a result of the user turning on the power source to the printer 1 by operating the operation portion 7, the CPU 21 reads out a program from the ROM 22 and performs the main processing. When the main processing is performed, the CPU 21 specifies one of the power sources, of the plurality of power sources (step S1). In this case, the CPU 21 specifies one of the AC adaptor 30, the USB power supply 31, and the battery 29.

The CPU 21 acquires the voltage of the specified power source, using the power source detection portion 21A (step S3). Next, the CPU 21 determines whether or not the power source for which the voltage has been acquired is the battery 29 (step S5). When it is determined that the power source is not the battery 29 (no at step S5), the CPU 21 determines whether the voltage acquired by the processing at step S3 is equal to or greater than a predetermined threshold value (step S7). In this case, the CPU 21 uses, as the predetermined threshold value, the second threshold value or the third threshold value. When the specified power source is the AC adaptor 30, the CPU 21 compares the voltage acquired by the processing at step S3 with the second threshold value. Further, when the specified power source is the USB power supply 31, the CPU 21 compares the voltage acquired by the processing at step S3 with the third threshold value.

When it is determined that the voltage acquired by the processing at step S3 is equal to or greater than the predetermined threshold value (yes at step S7), the CPU 21 determines that the power source specified by the processing at step S1 can be used (step S9). In this case, the CPU 21 temporarily stores, in the RAM 24, information indicating that the power source specified by the processing at step S1 can be used. The CPU 21 advances the processing to step S19.

On the other hand, when it is determined that the voltage acquired by the processing at step S3 is smaller than the predetermined threshold value (no at step S7), the CPU 21 determines that the power source specified by the processing at step S1 cannot be used (step S11). In this case the CPU 21 temporarily stores, in the RAM 24, information indicating that the power source specified by the processing at step S1 cannot be used. The CPU 21 advances the processing to step S19.

On the other hand, when it is determined that the power source for which the voltage has been acquired is the battery 29 (yes at step S5), the CPU 21 acquires the temperature t of the battery 29 (step S13). In this case, the CPU 21 temporarily stores, in the RAM 24, the detection result by the temperature sensor 25.

The CPU 21 determines whether or not the temperature t of the battery 29 acquired from the temperature sensor 25 is within a predetermined range (step S15). Here, the predetermined range is a range in which the battery 29 can normally output the first power, and is a value based on the specification of the battery 29. For example, the predetermined range is 0° C. to 50° C.

When it is determined that the temperature t of the battery 29 acquired from the temperature sensor 25 is not within the predetermined range (no at step S15), the CPU 21 determines that the battery 29 cannot be used (step S11). In this case, the CPU 21 temporarily stores, in the RAM 24, information indicating that the battery 29 cannot be used. The CPU 21 advances the processing to step S19.

When it is determined that the temperature t of the battery 29 is within the predetermined range (yes at step S15), the CPU 21 determines that the battery 29 can be used (step S17). In this case, the CPU 21 temporarily stores, in the RAM 24, information indicating that the battery 29 can be used. The CPU 21 advances the processing to step S19.

The CPU 21 determines whether or not verification of usability of all the power sources is complete (step S19). When it is determined that the verification of the usability of all the power sources is not complete (no at step S19), the CPU 21 returns the processing to step S1, and specifies the next power source. When it is determined that the verification of the usability of all the power sources is complete (yes at step S19), the CPU 21 performs judgment processing (step S21).

Figure 10:
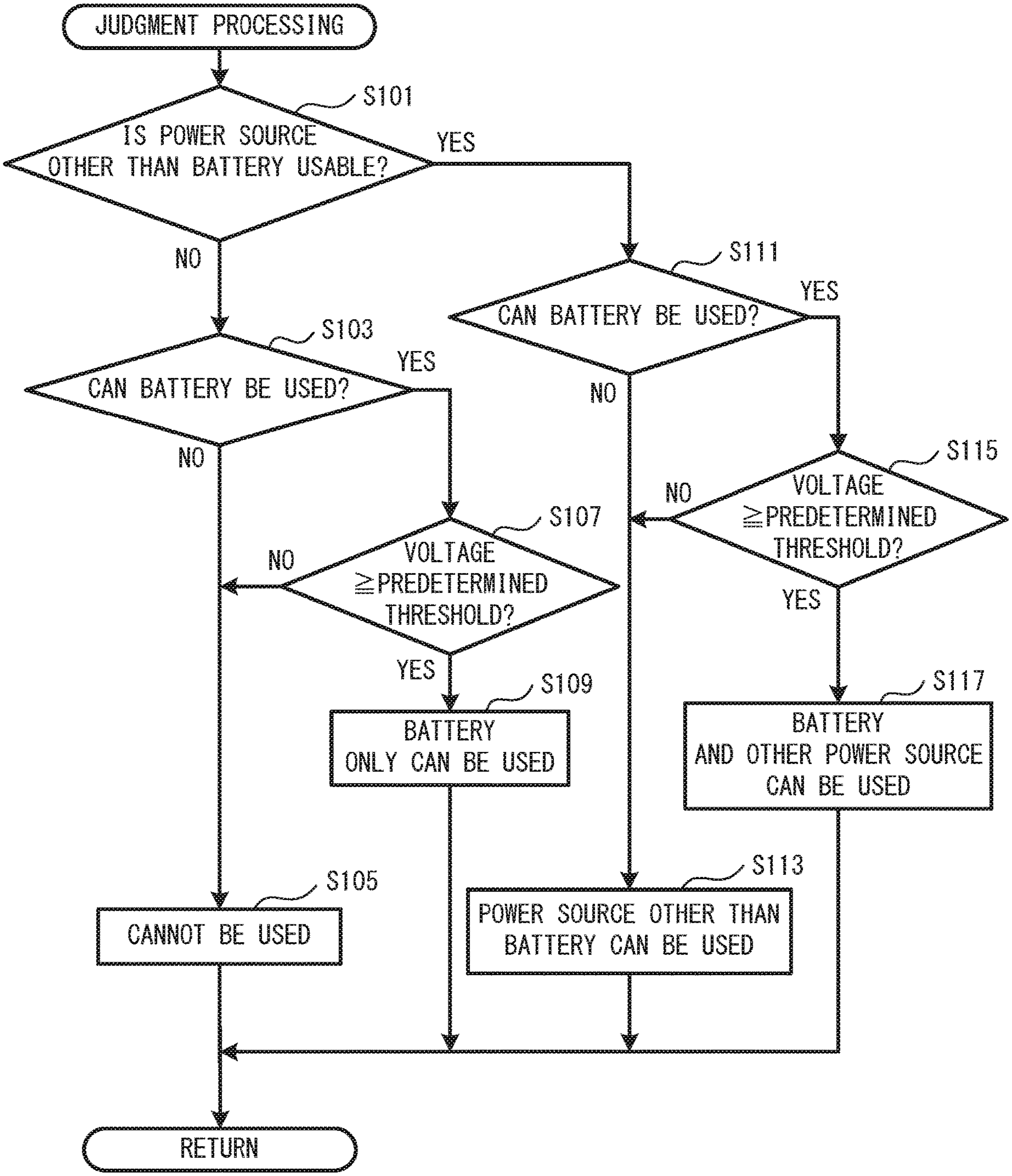
FIG. 10 is a flowchart showing judgment processing.

The judgment processing will be described with reference to FIG. 10. When the judgment processing is started, the CPU 21 determines whether or not the power source other than the battery 29 can be used (step S101). In this case, the CPU 21 determines whether or not the AC adaptor 30 and the USB power supply 31 can be used on the basis of the information stored in the RAM 24.

When it is determined that the power source other than the battery 29 cannot be used (no at step S101), the CPU 21 determines whether or not the battery 29 can be used (step S103). In this case, the CPU 21 refers to the RAM 24 and determines whether or not the battery 29 can be used.

When it is determined that the battery 29 cannot be used (no at step S103), there is no power source that can be used, and thus, the CPU 21 determines that all of the plurality of power sources cannot be used (step S105). In this case, the CPU 21 stores, in the RAM 24, information indicating that all of the power sources cannot be used. The CPU 21 returns the processing to the main processing, and performs the processing at step S23. In this case, since there is no power source that can be used, of the plurality of power sources, the CPU 21 does not perform the printing after the end of the main processing.

On the other hand, when it is determined that the battery 29 can be used (yes at step S103), the CPU 21 determines whether or not the voltage of the battery 29 is equal to or greater than a predetermined threshold value (step S107). In this case, the CPU 21 uses the fourth threshold value as the predetermined threshold value. When it is determined that the voltage of the battery 29 is equal to or greater than the predetermined threshold value (yes at step S107), the CPU 21 determines that the battery 29 only can be used (step S109). In this case, the printer 1 can perform the driving using the single power source of the battery 29. The CPU 21 temporarily stores, in the RAM 24, information indicating that the battery 29 only can be used. The CPU 21 returns the processing to the main processing and performs the processing at step S23.

On the other hand, when it is determined that the power source other than the battery 29 can be used (yes at step S101), the CPU 21 determines whether or not the battery 29 can be used (step S111). When it is determined that the battery 29 cannot be used (no at step S111), the CPU 21 determines that only the power source other than the battery 29 can be used (step S113). In this case, the printer 1 can perform the driving using the single power source of the AC adaptor 30 or the USB power supply 31. The CPU 21 temporarily stores, in the RAM 24, information indicating that the AC adaptor 30 or the USB power supply 31 only can be used. The CPU 21 returns the processing to the main processing, and performs the processing at step S23.

When it is determined that the battery 29 can be used (yes at step S111), the CPU 21 determines whether or not the voltage of the battery 29 is equal to or greater than a predetermined threshold value (step S115). In this case, the CPU 21 uses the fifth threshold value as the predetermined threshold value. When it is determined that the voltage of the battery 29 is smaller than the predetermined threshold value (no at step S115), the CPU 21 determines that only the power source other than the battery 29 can be used (step S113). In this case, the printer 1 can perform the driving using the single power source of the AC adaptor 30 or the USB power supply 31. The CPU 21 temporarily stores, in the RAM 24, the information indicating that the AC adaptor 30 or the USB power supply 31 only can be used. The CPU 21 returns the processing to the main processing, and performs the processing at step S23.

On the other hand, when it is determined that the voltage of the battery 29 is equal to or greater than the predetermined threshold value (yes at step S115), the CPU 21 determines that the battery 29 and the other power source can be used (step S117). In this case, the driving can be performed using the plurality of power sources of the battery 29 and one of the AC adaptor 30 or the USB power supply 31. The CPU 21 temporarily stores, in the RAM 24, information indicating that the AC adaptor 30 or the USB power supply 31, and the battery 29 can be used. The CPU 21 returns the processing to the main processing, and performs the processing at step S23.

When the judgment processing at step S21 ends, the CPU 21 determines whether or not all of the power sources are unable to be used (step S23). When all of the power sources cannot be used (yes at step S23), the CPU 21 notifies the user that all of the power sources cannot be used (step S25). For example, the CPU 21 causes the LEDs 4A to 4D to flash red. In this way, the user can recognize that all of the power sources cannot be used. The CPU 21 ends the processing.

On the other hand, when it is determined that it is not the case that all of the power sources cannot be used (no at step S23), the CPU 21 performs power supply processing on the basis of the power source that can be used stored in the RAM 24 (step S27). When performing the driving using the single power source of the battery 29, the CPU 21 supplies at least some of the first power of the battery 29 to the head 10 and the conveyance motor 9. When performing the driving using the single power source of the AC adaptor 30, the CPU 21 supplies at least some of the second power of the AC adaptor 30 to the head 10 and the conveyance motor 9. When performing the driving using the single power source of the USB power supply 31, the CPU 21 supplies at least some of the third power of the USB power supply 31 to the head 10 and the conveyance motor 9.

When performing the driving using the plurality of power sources of the battery 29 and the AC adaptor 30, the CPU 21 supplies at least some of the first power of the battery 29 to the head 10, and supplies at least some of the second power of the AC adaptor 30 to the conveyance motor 9.

When performing the driving using the plurality of power sources of the battery 29 and the USB power supply 31, the CPU 21 supplies at least some of the first power of the battery 29 to the head 10, and supplies at least some of the third power of the USB power supply 31 to the conveyance motor 9. Next, the CPU 21 performs speed decision processing to decide the print speed at which the printing is to be performed (step S29).

Figure 11:
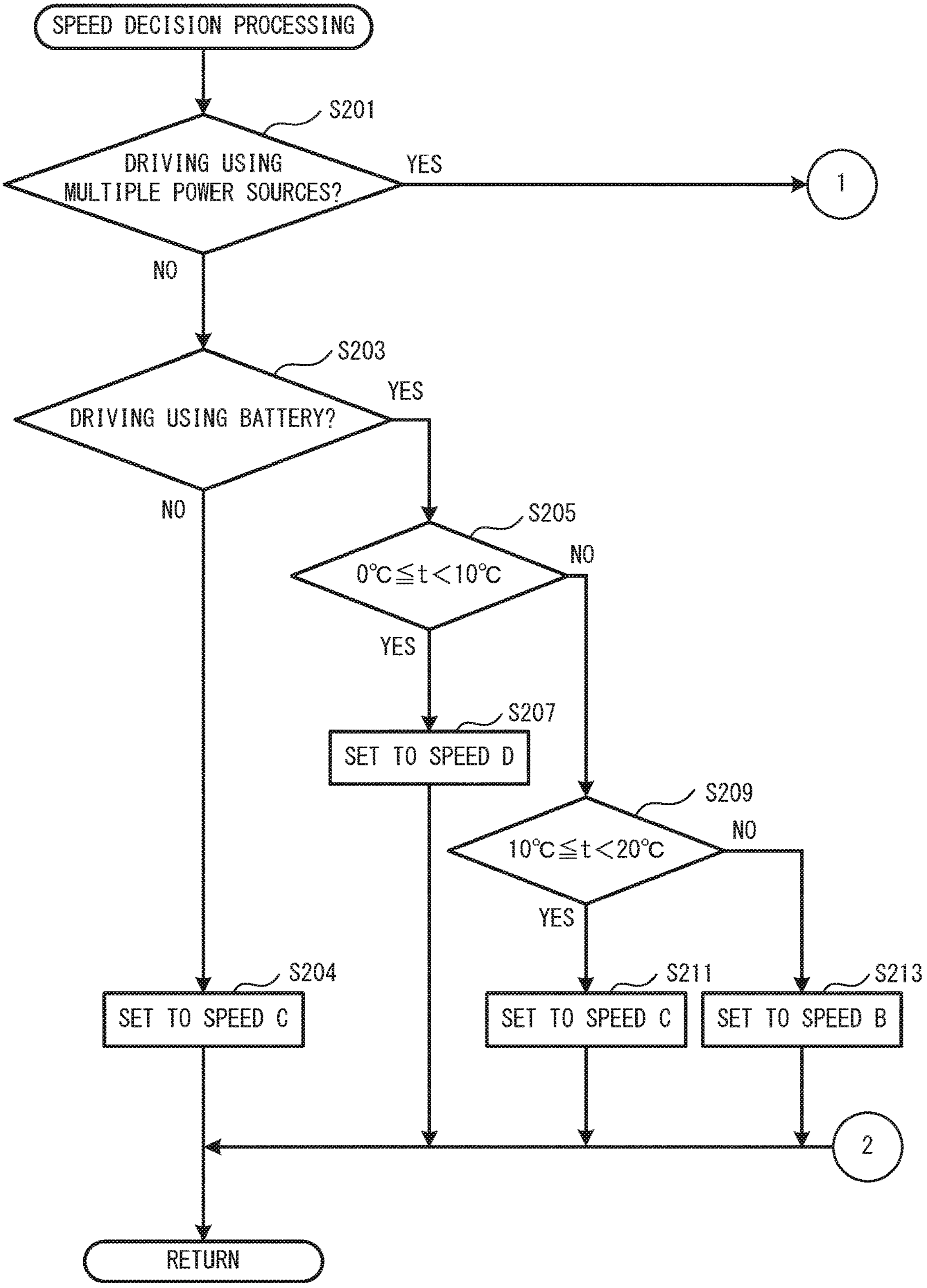
FIG. 11 is a flowchart showing speed decision processing.
Figure 12:
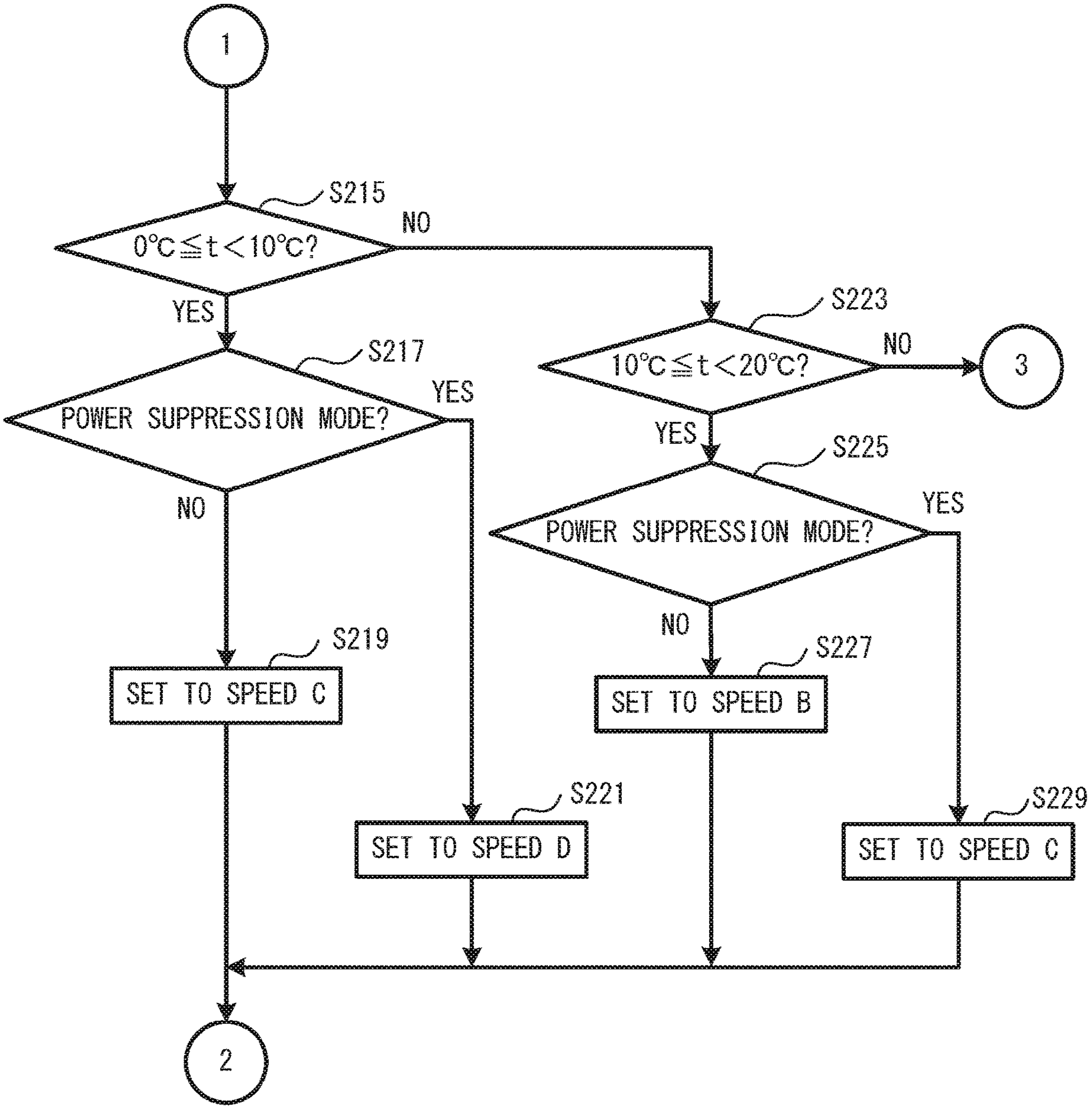
FIG. 12 is a flowchart showing the speed decision processing, and is a continuation of FIG. 11.
Figure 13:
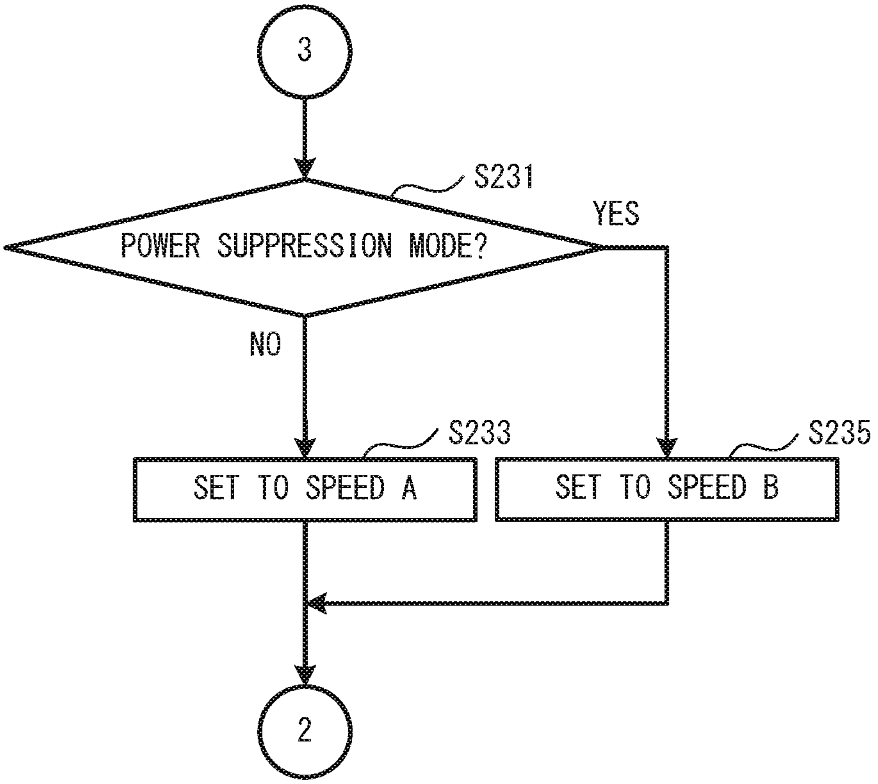
FIG. 13 is a flowchart showing the speed decision processing, and is a continuation of FIG. 12.

The speed decision processing will be described with reference to FIG. 11 to FIG. 13. When the speed decision processing is started, the CPU 21 determines whether or not the driving is to be performed using the plurality of power sources (step S201). The driving using the plurality of power sources refers to driving the printer 1 using the battery 29 and the AC adaptor 30, or to driving the printer 1 using the battery 29 and the USB power supply 31.

When it is determined that the driving is not to be performed using the plurality of power sources (no at step S201), the CPU 21 determines whether or not the driving is to be performed using the single power source of the battery 29 (step S203). When it is determined that the driving is not to be performed using the single power source of the battery 29 (no at step S203), this means that the driving is to be performed using the single power source of one of the AC adaptor 30 or the USB power supply 31, and thus, the CPU 21 refers to the table T and sets the print speed to the speed C (step S204). The CPU 21 returns the processing to the main processing.

When it is determined that the driving is to be performed using the single power source of the battery 29 (yes at step S203), the CPU 21 determines whether or not the temperature t of the battery 29 is equal to or greater than 0° C. and less than 10° C. (step S205). When it is determined that the temperature t of the battery 29 is equal to or greater than 0° C. and less than 10° C. (yes at step S205), the CPU 21 refers to the table T and sets the print speed to the speed D (step S207). The CPU 21 returns the processing to the main processing.

When it is determined that the temperature t of the battery 29 is not equal to or greater than 0° C. and less than 10° C. (no at step S205), the CPU 21 determines whether or not the temperature t of the battery 29 is equal to or greater than 10° C. and less than 20° C. (step S209). When it is determined that the temperature t of the battery 29 is equal to or greater than 10° C. and less than 20° C. (yes at step S209), the CPU 21 refers to the table T and sets the print speed to the speed C (step S211). The CPU 21 returns the processing to the main processing.

When it is determined that the temperature t of the battery 29 is not equal to or greater than 10° C. and less than 20° C. (no at step S209), this means that the temperature t of the battery 29 is equal to or greater than 20° C. and less than 50° C., and thus, the CPU 21 refers to the table T and sets the print speed to the speed B (step S213). The CPU 21 returns the processing to the main processing.

On the other hand, when it is determined that the driving is to be performed using the plurality of power sources (yes at step S201), the CPU 21 determines whether or not the temperature t of the battery 29 is equal to or greater than 0° C. and less than 10° C. (step S215). When it is determined that the temperature t of the battery 29 is equal to or greater than 0° C. and less than 10° C. (yes at step S215), the CPU 21 determines whether or not the power suppression mode is set (step S217). The determination as to whether the power suppression mode is set is made on the basis of whether or not the power suppression mode has been set by the user.

When it is determined that the power suppression mode is not set (no at step S217), this means that the high speed mode is set, and thus, the CPU 21 refers to the table T and sets the print speed to the speed C (step S219). The CPU 21 returns the processing to the main processing. When it is determined that the power suppression mode is set (yes at step S217), the CPU 21 sets the print speed to the speed D (step 221). In this case, the CPU 21 restricts the number of on dots to a smaller number of dots than the number of on dots at the speed C set by the processing at step S219. The CPU 21 returns the processing to the main processing.

On the other hand, when it is determined that the temperature t of the battery 29 is not equal to or greater than 0° C. and less than 10° C. (no at step S215), the CPU 21 determines whether or not the temperature t of the battery 29 is equal to or greater than 10° C. and less than 20° C. (step S223). When it is determined that the temperature t of the battery 29 is equal to or greater than 10° C. and less than 20° C. (yes step S223), the CPU 21 determines whether or not the power suppression mode is set (step S225).

When it is determined that the power suppression mode is not set (no at step S225), this means that the high speed mode is set, and thus, the CPU 21 refers to the table T and sets the print speed to the speed B (step S227). The CPU 21 returns the processing to the main processing. When it is determined that the power suppression mode is set (yes at step S225), the CPU 21 refers to the table T and sets the print speed to the speed C (step 229). In this case, the CPU 21 restricts the number of on dots to a smaller number of dots than the number of on dots at the speed B set by the processing at step S227.

On the other hand, when it is determined that the temperature t of the battery 29 is not equal to or greater than 10° C. and less than 20° C. (no at step S223), the CPU 21 determines whether or not the power suppression mode is set (step S231). When it is determined that the power suppression mode is not set (no at step S231), this means that the high speed mode is set, and also, the temperature t of the battery 29 is equal to or greater than 20° C. and less than 50° C. Thus, the CPU 21 refers to the table T and sets the print speed to the speed A (step S233). The CPU 21 returns the processing to the main processing. When it is determined that the power suppression mode is set (yes at step S231), the CPU 21 refers to the table T and sets the print speed to the speed B (step 235). In this case, the CPU 21 restricts the number of on dots to a smaller number of dots than the number of on dots at the speed A set by the processing at step S233. The CPU 21 returns the processing to the main processing.

When the speed decision processing ends and the processing is returned to the main processing, the CPU 21 ends the main processing. Thereafter, the printing can be performed at the set print speed.

As described above, when the battery 29 is connected to the battery mount 34, and the AC adaptor 30 is connected to the AC adaptor jack 32, the power supply circuit 100 supplies at least some of the first power to the head 10 and supplies at least some of the second power to the conveyance motor 9.

The printer 1 supplies the first power of the battery 29 to the head 10 and supplies the second power to the conveyance motor 9. Thus, it is possible to efficiently use the power supplied from the plurality of power sources. As a result, the printer 1 does not need to increase the size of each of the power sources in order to drive the head 10 and the conveyance motor 9. Thus, the printer 1 can suppress an increase in size.

The power supply circuit 100 simultaneously performs the supply of at least some of the first power to the head 10 and the supply of at least some of the second power to the conveyance motor 9. The printer 1 supplies the first power to the head 10 and simultaneously supplies the second power to the conveyance motor 9, and it is thus possible to efficiently use the respective powers.

When the battery 29 is connected to the battery mount 34, and the AC adaptor 30 is not connected to the AC adaptor jack 32, the power supply circuit 100 supplies at least some of the first power to the head 10 and the conveyance motor 9. The printer 1 can drive the head 10 and the conveyance motor 9 using the first power of the battery 29 only.

When the AC adaptor 30 is connected to the AC adaptor jack 32, and the battery 29 is not connected to the battery mount 34, the power supply circuit 100 supplies at least some of the second power to the head 10 and the conveyance motor 9. The printer 1 can drive the head 10 and the conveyance motor 9 using the second power of the AC adaptor 30 only.

The first power is larger than the second power. In the printer 1, of the head 10 and the conveyance motor 9, the power required by the head 10 is sometimes greater. In this case, the printer 1 supplies, to the head 10, the first power of the battery 29 that is larger than the power of the AC adaptor 30. Thus, the printer 1 can efficiently supply the power from the power source.

The plurality of power sources includes the battery 29, the AC adaptor 30, and the USB power supply 31. The printer 1 can efficiently use the power of these power sources without an increase in size of the battery 29, the AC adaptor 30, and the USB power supply 31.

When the battery 29 is connected to the battery mount 34, and the USB power supply 31 is connected to the USB jack 33, the power supply circuit 100 supplies at least some of the first power to the head 10 and supplies at least some of the third power, which is the power of the USB power supply 31, to the conveyance motor 9. In addition to the battery 29 and the AC adaptor 30, the USB power supply 31 can be connected to the printer 1. The printer 1 can efficiently use the respective powers of the battery 29, the AC adaptor 30, and the USB power supply 31.

The power supply circuit 100 is provided with the first wiring line L1, the first switch SW1, the second wiring line L2, the second switch SW2, the third wiring line L3, the third switch SW3, and the fourth wiring line L4. When the first wiring line L1 and the third wiring line L3 are in the non-conduction state, and the second wiring line L2 is in the conduction state, the printer 1 can supply at least some of the first power of the battery 29 to the head 10, and can supply at least some of the second power of the AC adaptor 30 to the conveyance motor 9. When the first wiring line L1 and the second wiring line L2 are in the non-conduction state, and the third wiring line L3 is in the conduction state, the printer 1 can supply at least some of the first power of the battery 29 to the head 10 and the conveyance motor 9. When only the AC adaptor 30 is connected, the third wiring line L3 is in the non-conduction state, and the first wiring line L1 and the second wiring line L2 are in the conduction state, the printer 1 can supply at least some of the second power of the AC adaptor 30 to the head 10 and the conveyance motor 9.

The fifth wiring line L5 is connected to the USB jack 33, and is electrically connected to the first wiring line L1, between the AC adaptor jack 32 and the first switch SW1. The printer 1 can use the battery 29, the AC adaptor 30, and the USB power supply 31 to supply the power to the head 10 or the conveyance motor 9.

The power supply circuit 100 is provided with the first bleeder circuit 38A, the second bleeder circuit 38B, the first bleeder resistor 38C, and the second bleeder resistor 38D. There is a case in which only one of the AC adaptor 30 and the USB power supply 31 is connected to the printer 1. In this case, there is a possibility, in the printer 1, that an unnecessary voltage may be generated in a connector that is not connected, of the power sources of the AC adaptor jack 32 or the USB jack 33. The first bleeder circuit 38A and the first bleeder resistor 38C can inhibit the generation of the voltage in the USB jack 33 to which the USB power supply 31 is not connected. Further, the second bleeder circuit 38B and the second bleeder resistor 38D can inhibit the generation of the voltage in the AC adaptor jack 32 to which the AC adaptor 30 is not connected. Thus, the printer 1 can inhibit erroneous detection of the connected power source.

The power source detection portion 21A detects whether or not the usable power source is connected, by detecting the respective voltages of the battery 29, the AC adaptor 30, and the USB power supply 31. The printer 1 can recognize the usable power source using the power source detection portion 21A.

The display portion 4 displays the information as to which of the power sources, of the battery 29, the AC adaptor 30, and the USB power supply 31, is being used. By checking the display portion 4, the user can recognize which of the power sources, of the battery 29, the AC adaptor 30, and the USB power supply 31, is being used.

The display portion 4 is configured by the plurality of LEDs 4A to 4C provided corresponding to the battery 29, the AC adaptor 30, and the USB power supply 31. The plurality of LEDs 4A to 4C are illuminated in correspondence with the power source being used. The user can recognize the power source being used, on the basis of an illumination state of the LEDs 4A to 4C.

The display portion 4 includes the LED 4D that can generate the plurality of colors. Of the plurality of colors, the LED 4D is illuminated in the color corresponding to the power source being used. The user can recognize the power source being used, on the basis of the color of the LED 4D.

The CPU 21 decides the print speed, which is the speed at which the printing is performed on the medium M, on the basis of the detected temperature t of the battery 29. The CPU 21 decreases the print speed the lower the detected temperature t of the battery 29. The CPU 21 decides the print speed such that, compared to when the battery 29 is connected to the battery mount 34, and the AC adaptor 30 is not connected to the AC adaptor jack 32, the print speed is faster or the same when the battery 29 is connected to the battery mount 34 and the AC adaptor 30 is connected to the AC adaptor jack 32. In the above-described printer 1, when the temperature t of the battery 29 is low, the power that can be supplied by the battery 29 becomes lower. Even when the temperature t of the battery 29 is low, the printer 1 drives the head 10 using at least some of the first power of the battery 29, and drives the conveyance motor 9 using at least some of second power of the AC adaptor 30. Thus, when the temperature t of the battery 29 has become low, the printer 1 can cause the print speed to be faster, compared to driving the head 10 and the conveyance motor 9 using only the battery 29.

When the battery 29 is connected to the battery mount 34, and the AC adaptor 30 is connected to the AC adaptor jack 32, the CPU 21 determines whether or not to perform the power suppression mode that suppresses at least some of the first power supplied by the battery 29. When it is determined to perform the power suppression mode, the CPU 21 restricts the number of on dots for which the heating elements of the head 10 can be simultaneously heated. By restricting the number of on dots that can be simultaneously heated, the printer 1 can reduces the first power supplied by the battery 29.

When it is determined that, of the battery 29 and the AC adaptor 30, only one of the power sources can be used, the CPU 21 supplies, to the head 10 and the conveyance motor 9, the power of the one power source. When it is determined that both the battery 29 and the AC adaptor 30 can be used, the CPU 21 supplies at least some of the first power, which is the power of the battery 29 connected to the battery mount 34, to the head 10. The CPU 21 supplies at least some of the second power, which is the power of the AC adaptor 30 connected to the AC adaptor jack 32, to the conveyance motor 9.

Depending on the state of the power sources, in the printer 1, there is a case in which the power required for the driving of the head 10 and the conveyance motor 9 is not sufficient. In this case, the printer 1 divides up the printing of a single line, for example. Thus, there is a possibility that the print speed may decrease due to the insufficient power. The printer 1 supplies the power of the usable power source to the head 10 and the conveyance motor 9 after determining the usable power source in advance. Thus, the printer 1 can reduce the possibility of the print speed decreasing. Further, when it is determined that both the battery 29 and the AC adaptor 30 can be used, the printer 1 supplies at least some of the first power of the battery 29 to the head 10, and supplies at least some of the second power to the conveyance motor 9. In this way, the printer 1 can drive the head 10 and the conveyance motor 9 using the powers of the respectively different power sources. As a result, in the printer 1, it is not necessary to increase the size of each of the power sources and increase the power that can be supplied in order to increase the print speed. Thus, the printer 1 can suppress the increase in size without causing the print speed to decrease.

When it is determined that there is no usable power source, among the plurality of power sources, the CPU 21 does not perform the printing. When the printing is performed using the power source that has not satisfied usable conditions, there is a case in which the printer 1 has insufficient power to drive the head 10. Due to this, it is possible that, in the printer 1, the print speed may decrease or the print quality may deteriorate. When there is no usable power source, the printer 1 does not perform the printing, and thus, the printing is not performed in a state in which there is the possibility that the print speed has decreased, or that the print quality will deteriorate.

When the voltage output from the battery 29 is equal to or greater than the first threshold value, the CPU 21 determines that the battery 29 is the power source that can be used. When the voltage output from the AC adaptor 30 is equal to or greater than the second threshold value, the CPU 21 determines that the AC adaptor 30 is the power source that can be used. The printer 1 can determine whether the battery 29 and the AC adaptor 30 are the power sources that can be used, using the voltage output from each of the battery 29 and the AC adaptor 30.

When it is determined that the voltage output from the USB power supply 31 is equal to or greater than the third threshold value, the CPU 21 determines that the USB power supply 31 can be used. The printer 1 can determine whether the USB power supply 31 can be used by comparing the voltage output from the USB power supply 31 with the third threshold value.

The first threshold value includes the fourth threshold value and the fifth threshold value that is greater than the fourth threshold value. When, of the plurality of power sources, the power source other than the battery 29 cannot be used, and the voltage output from the battery 29 is equal to or greater than the fourth threshold value, the CPU 21 determines that the battery 29 is the usable power source. When, of the plurality of power sources, the power source other than the battery 29 can be used, and the voltage output from the battery 29 is equal to or greater than the fifth threshold value, the CPU 21 determines that the battery 29 is the usable power source. When the plurality of power sources can be used, in the printer 1, the power that can be output from the battery 29 increases. In this case, by setting the fifth threshold value to be greater than the fourth threshold value, the printer 1 can determine whether the first power that can be supplied by the battery 29 is sufficient.

The temperature sensor 25 detects the temperature of the battery 29. The CPU 21 determines that the power source for which the temperature of the battery 29 detected by the temperature sensor 25 is within the predetermined temperature range to be the power source that can be used. The performance of the battery 29 changes depending on the ambient temperature. The printer 1 determines, in advance, whether the power source can be used, on the basis of the detected temperature of the battery 29. Thus, the printer 1 can avoid using the power source for which there is a high possibility that the print speed will decrease.

Figure 14:
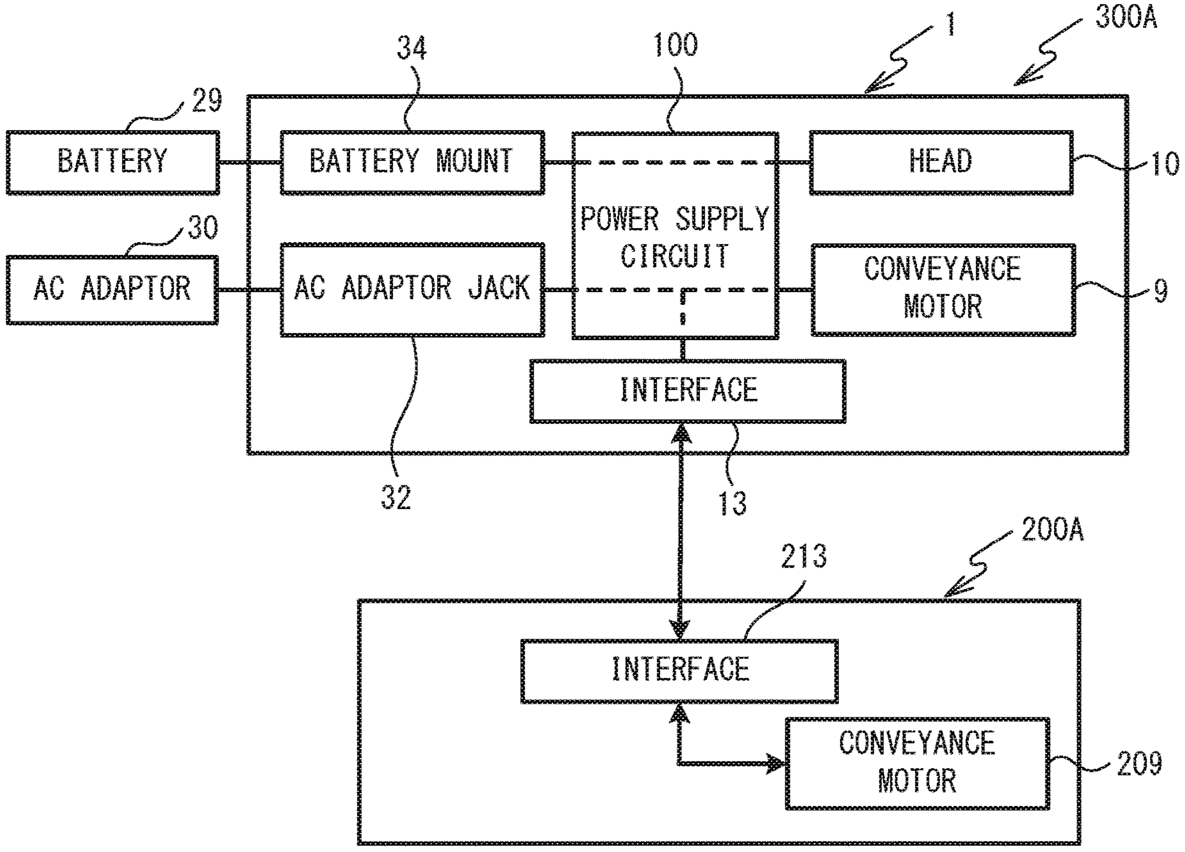
FIG. 14 is a diagram showing a print system.

A print system 300A will be described with reference to FIG. 14. In the following description, configurations having the same functions as those of the above-described embodiment will be assigned the same reference signs, and a description thereof will be omitted or simplified. The print system 300A is configured by the printer 1 of the above-described embodiment and a medium feed device 200A. In the print system 300A, the printer 1 performs the printing on the medium M supplied by the medium feed device 200A.

The medium feed device 200A is provided with an interface 213, and a conveyance motor 209. The interface 213 of the medium feed device 200A is connected to an interface 13 of the printer 1. The medium feed device 200A is driven by commands from the printer 1.

When the battery 29 is connected to the battery mount 34, and the AC adaptor 30 is connected to the AC adaptor jack 32, the power supply circuit 100 supplies at least some of the first power to the head 10. In this case, the power supply circuit 100 supplies at least some of the second power to the conveyance motor 9 and to the conveyance motor 209 of the medium feed device 200A, via the interfaces 13 and 213. In other words, the power supply circuit 100 of the printer 1 transmits the power to the conveyance motor 209 via the interfaces 13 and 213. The print system 300A can drive the printer 1 and the medium feed device 200A by efficiently using the first power of the battery 29 and the second power of the AC adaptor 30. In this way, in the print system 300A, it is not necessary to increase a size of a power source for driving the medium feed device 200A. Furthermore, the print system 300A can also increase the print speed using the two power sources.

Figure 15:
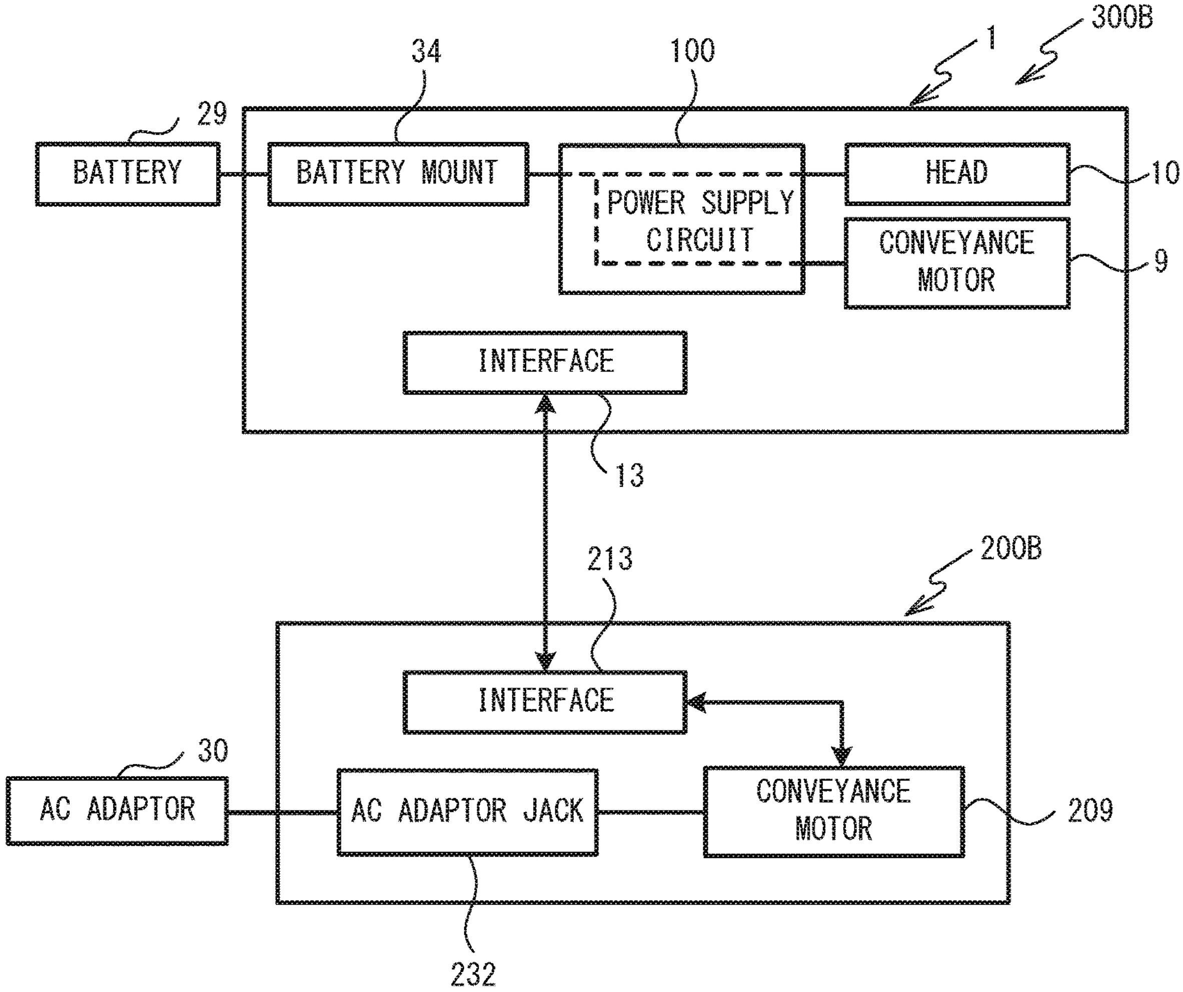
FIG. 15 is a diagram showing a print system.

A print system 300B will be described with reference to FIG. 15. In the following description, configurations having the same functions as those of the above-described embodiment will be assigned the same reference signs, and a description thereof will be omitted or simplified. The print system 300B is configured by the printer 1 of the above-described embodiment and a medium feed device 200B. In the print system 300B, the printer 1 performs the printing on the medium M supplied by the medium feed device 200B.

The medium feed device 200B includes an AC adaptor jack 232. The AC adaptor 30 is connected to the AC adaptor jack 232 of the medium feed device 200B. Note that the AC adaptor 30 may be a device different from that of the above-described embodiment.

When the battery 29 is connected to the battery mount 34, the power supply circuit 100 supplies at least some of the first power to the head 10 and the conveyance motor 9. When the AC adaptor 30 is connected to the AC adaptor jack 232, the medium feed device 200B supplies at least some of the second power to the conveyance motor 209. In the print system 300B, the printer 1 and the medium feed device 200B are respectively driven by the battery 29 and the AC adaptor 30. Thus, the print system 300B can drive the printer 1 and the medium feed device 200B without an increase in size of the printer 1.

Figure 16:
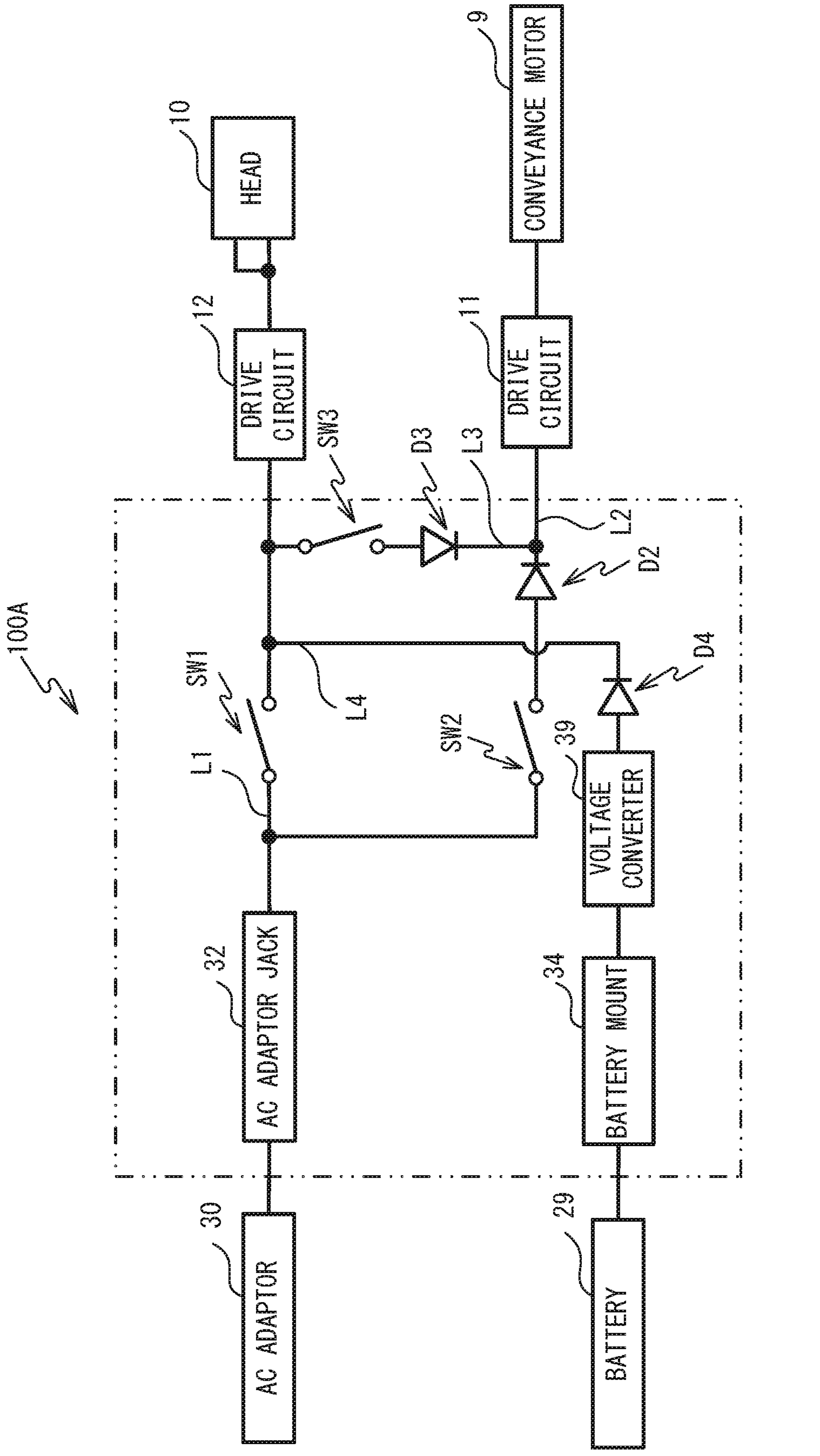
FIG. 16 is a diagram showing a power supply circuit according to a modified example.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

A power supply circuit 100A according to a modified example will be described with reference to FIG. 16. The power supply circuit 100A differs from the power supply circuit 100 of the above-described embodiment in that the power supply circuit 100A is not provided with the USB jack 33, the diode D5, and the fifth wiring line L5. In this case also, the printer 1 can perform the driving using the single power source of the battery 29 or the AC adaptor 30. Furthermore, the printer 1 can perform the driving using the plurality of power sources of the battery 29 and the AC adaptor 30.

Figure 17:
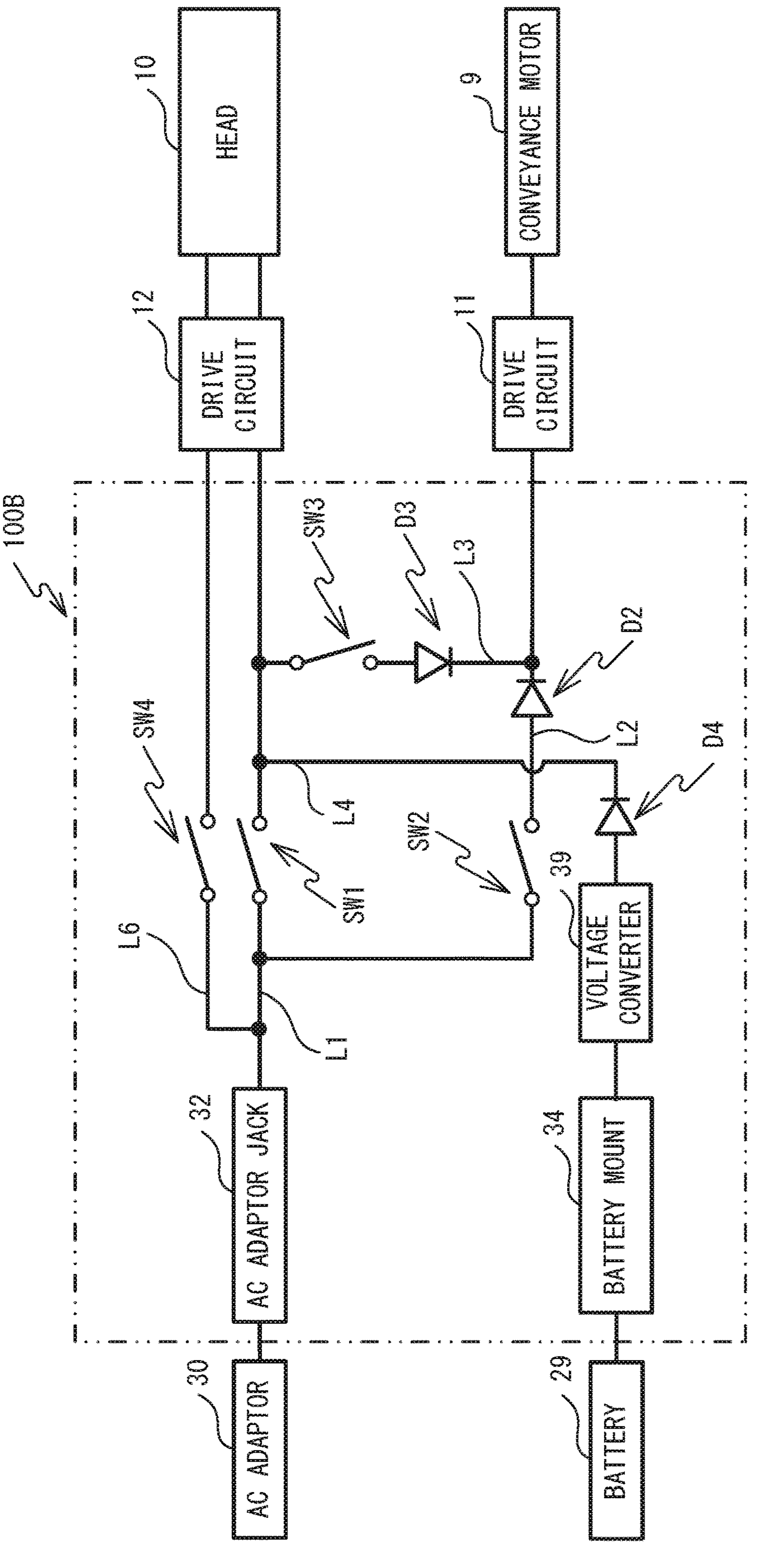
FIG. 17 is a diagram showing a power supply circuit according to a modified example.

A power supply circuit 100B according to a modified example will be described with reference to FIG. 17. The power supply circuit 100B differs from the power supply circuit 100A in that the power supply circuit 100B is provided with a fourth switch SW4 and a sixth wiring line L6. Further, when the power supply circuit 100B is used, there are two supply portion systems in the head 10 for supplying the power of the power supply. Of the head 10, portions to which the power is supplied by the two supply portion systems are, respectively referred to as a first portion and a second portion.

The fourth switch SW4 is electrically connected to the first wiring line L1, between the AC adaptor jack 32 and the first switch SW1. The fourth switch SW4 is electrically connects to the drive circuit 12. The sixth wiring line L6 is a wiring line connected to the AC adaptor jack 32 and the head 10.

A case will be described in which the power adjustment portion 21C turns the first switch SW1, the second switch SW2 and the fourth switch SW4 on, and turns the third switch SW3 off. In this case, the printer 1 performs the driving using the single power source of the AC adaptor 30. In this case, at least some of the second power supplied from the AC adaptor 30 is supplied to the drive circuit 12 via the first wiring line L1 and the sixth wiring line L6. The drive circuit 12 supplies the second power supplied via the first wiring line L1 to the first portion of the head 10. The drive circuit 12 can supply the second power to the second portion of the head 10 via the sixth wiring line L6. In this case, at least some of the second power supplied from the AC adaptor 30 is supplied to the conveyance motor 9 via the second wiring line L2. Note that at least some of the second power supplied from the AC adaptor 30 may be supplied to the conveyance motor 9 via the first wiring line L1, the third wiring line L3, and the second wiring line L2.

A case will be described in which the power adjustment portion 21C turns the fourth switch SW4 and the third switch SW3 on, and turns the first switch SW1 and the second switch SW2 off. In this case, the printer 1 performs the driving using the plurality of power sources of the battery 29 and the AC adaptor 30. In other words, the battery 29 is connected to the battery mount 34 and the AC adaptor 30 is connected to the AC adaptor jack 32. In this case, the power supply circuit 100B supplies at least some of the first power to the first portion of the head 10, via the fourth wiring line L4 and the first wiring line L1. The power supply circuit 100B supplies at least some of the first power to the conveyance motor 9 via the fourth wiring line L4 and the third wiring line L3. The power supply circuit 100B supplies at least some of the second power to the second portion, which is different from the first portion, of the head 10, via the sixth wiring line L6. In this way, the printer 1 can efficiently use the plurality of power sources without an increase in size. Note that, with the power supply circuit 100B, the USB power supply 31 may be connected instead of the AC adaptor 30.

The present disclosure may further be changed from the above-described embodiment. Note that technologies disclosed in the above-described embodiment and in modified examples to be described below may be combined insofar as no contradictions arise. The above-described printer 1 is not limited to the printer that performs the printing on the heat-sensitive cut paper. For example, the printer 1 may be a thermal transfer type printer, or may be an inkjet printer.

The driving is performed using the three power sources of the battery 29, the AC adaptor 30, and the USB power supply 31, but the configuration is not limited to this example. For example, a configuration may be adopted in which two or less of the power sources can be connected to the printer 1. Further, a configuration may be adopted in which four or more of the power sources may be connected to the printer 1.

In the above-described embodiment, it is assumed that one of the AC adaptor 30 or the USB power supply 31 is connected, but the configuration is not limited to this example. For example, a configuration may be adopted in which both the AC adaptor 30 and the USB power supply 31 can be simultaneously connected. In other words, the battery 29, the AC adaptor 30, and the USB power supply 31 may be simultaneously connected to the printer 1.

For example, with the power supply circuit 100, the battery 29 is connected to the battery mount 34, the AC adaptor 30 is connected to the AC adaptor jack 32, and the USB power supply 31 is connected to the USB jack 33. In this case, the CPU 21 may supply at least some of the first power to the head 10 and may supply at least some of the second power to the conveyance motor 9. When the battery 29, the AC adaptor 30, and the USB power supply 31 are connected, the printer 1 prioritizes the use of the battery 29 and the AC adaptor 30. The printer 1 does not spend time on the selection of the power source. Thus, the printer 1 can increase a processing speed.

In the above-described embodiment, the power supply circuit 100 supplies at least some of the first power of the battery 29 to the head 10 and supplies at least some of the second power of the AC adaptor 30 to the conveyance motor 9, but the configuration is not limited to this example. For example, the power supply circuit 100 may decide a supply destination of each of the power sources, on the basis of power consumed by the head 10 and the conveyance motor 9.

In other words, on the basis of the power consumed by the head 10 and the conveyance motor 9, the power supply circuit 100 may supply one of at least some of the first power of the battery 29 and at least some of the second power of the AC adapter 30 to one of the head 10 and the conveyance motor 9. In this case, on the basis of the power consumed by the head 10 and the conveyance motor 9, the power supply circuit 100 may supply the power of the other of at least some of the first power and at least some of the second power to the other of the head 10 and the conveyance motor 9.

In this case, on the basis of the power consumed by the head 10 and the conveyance motor 9, the printer 1 can efficiently supply the first power of the battery 29 and the second power of the AC adaptor 30 to the head 10 and the conveyance motor 9, respectively. As a result, the printer 1 does not need to increase the size of each of the power sources to drive the head 10 and the conveyance motor 9. Thus, the printer 1 can suppress the increase in size.

Furthermore, the power supply circuit 100 may supply the power of the power source having the larger power that can be supplied, of the battery 29 and the AC adaptor 30, to the one of the head 10 and the conveyance motor 9 that consumes the greater amount of power. Further, the power supply circuit 100 may supply the power of the power source having the smaller power that can be supplied, of the battery 29 and the AC adaptor 30, to the one of the head 10 and the conveyance motor 9 that consumes the smaller amount of power. The printer 1 can supply the power of the power source that can supply the greater amount of power to the device that consumes the greater amount of power. Further, the printer 1 can supply the power of the power source that can supply the smaller amount of power to the device that consumes the smaller amount of power.

More specifically, when the amount of power consumed by the conveyance motor 9 is smaller than the amount of power consumed by the head 10, the power supply circuit 100 may supply at least some of the first power of the battery 29 to the conveyance motor 9, and supply at least some of the second power of the AC adaptor 30 to the head 10.

In the above-described embodiment, the first power is greater than the second power, but the configuration is not limited to this example. For example, the first power may be smaller than the second power. In this case, the power supply circuit 100 may decide the supply destination of the power in accordance with the power required by the head 10 and the conveyance motor 9. The magnitude relationships between the first power, the second power, and the third power may be changed as appropriate.

The voltages output by the battery 29, the AC adaptor 30, and the USB power supply 31 of the above-described embodiment may be changed as appropriate. The first threshold value to the fifth threshold value may be changed as appropriate. For example, the first threshold value to the fifth threshold value may all be different values, or may be the same value.

In the above-described embodiment, when the voltage output from the battery 29 is equal to or greater than the first threshold value, it is determined that the battery 29 can be used, but the configuration is not limited to this example. In place of the first threshold value, another value may be used as the threshold value.

In the above-described embodiment, the temperature t of the battery 29 is detected by the temperature sensor 25, but the configuration is not limited to this example. The printer 1 may be provided with sensors that respectively detect the temperatures of the AC adaptor 30 and the USB power supply 31. In this case, the CPU 21 may determine, as the power source that can be used, the power source for which the temperature t of the plurality of power sources detected by the sensor is within the predetermined temperature range.

In the above-described embodiment, the power source that can be used is judged on the basis of the voltages that the plurality of power sources can supply, but the configuration is not limited to this example. For example, the CPU 21 may determine the power source that can be used, on the basis of the current that the plurality of power sources can supply. In this case, the CPU 21 acquires the current required to drive the head 10 and the conveyance motor 9. The CPU 21 determines whether or not the power source can be used, on the basis of whether or not the current required to drive the head 10 and the conveyance motor 9 can be supplied by the plurality of power sources. Of the plurality of power sources, the CPU 21 determines, as the power source that can be used, the power source that can supply the current greater than the current required to drive the head 10 and the conveyance motor 9. The printer 1 can determine whether or not the power source can be used, on the basis of the current that can be supplied.

When the current that can be supplied by the USB power supply 31 is greater than the current required to drive the conveyance motor 9, and the voltage output by the USB power supply 31 is equal to or greater than a sixth threshold value, the CPU 21 may supply the power of the power source of the USB power supply 31 to the conveyance motor 9, and may supply the first power of the battery 29 to the head 10. Further, when the current that can be supplied by the USB power supply 31 is smaller than the current required to drive the conveyance motor 9, and the voltage output by the USB power supply 31 is smaller than the sixth threshold value, the CPU 21 may supply the first power of the battery 29 to the head 10 and the conveyance motor 9. The printer 1 can control the supply of the power on the basis of the current and the voltage that can be supplied by the battery 29, the AC adaptor 30, and the USB power supply 31. Note that the value of the sixth threshold value may be set as appropriate.

In the above-described embodiment, one of the AC adaptor 30 and the USB power supply 31 is used, but a configuration may be adopted in which both the AC adaptor 30 and the USB power supply 31 can be used simultaneously. In this case, the battery 29 may be charged using the second power or the third power. For example, when it is determined that the battery 29 is the power source that cannot be used, and the AC adaptor 30 and the USB power supply 31 are the power sources that can be used, the CPU 21 may supply at least some of the second power from the AC adaptor 30 to the head 10 and the conveyance motor 9. In this case, the CPU 21 may supply at least some of the third power, which is the power from the USB power supply 31, to the battery 29. In this way, the printer 1 can perform the printing while charging the battery 29.

In the above-described embodiment, the four LEDs 4A to 4D are provided as the display portion 4, but the number of the LEDs is not limited to this example. For example, the number of the LEDs may be three or less, or may be five or more. In the first pattern, the LEDs 4A to 4C are used, but the configuration is not limited to this example. In the first pattern, for example, the LEDs 4B to 4D may be used. In the second pattern, the LED 4D is used but the configuration is not limited to this example. For example, one of the LEDs 4A to 4C may be used.

The display portion 4 displays the power source that is being used to the user by using the illumination pattern of the LEDs 4A to 4C, but the configuration is not limited to this example. For example, a configuration may be adopted in which the power source can be identified, as a usable power source, by using combinations of illumination patterns of the two LEDs 4A and 4C. Further, the power source that can be used is displayed to the user using the color of the LED 4D, but the configuration is not limited to this example. For example, a configuration may be adopted in which the power source can be identified, as a usable power source, in accordance with a speed of flashing of the LED 4A.

The display portion 4 is configured by the LEDs 4A to 4D but the configuration is not limited to this example. For example, a display may be provided, and the power source that can be used may be displayed using characters or the like. Further, by using audio, the display portion 4 may notify the power source that can be used to the user.

In the above-described embodiment, the print speed is decided on the basis of the table T, but the configuration is not limited to this example. With respect to the print speeds indicated in the table T, the speed A to the speed D may be changed appropriate in accordance with the specification of the power source, for example. The print speed when performing the driving using the single power source of the AC adaptor 30, and the print speed when performing the driving using the single power source of the USB power supply 31 may be different. The print speed in the power suppression mode need not necessarily be the same speed as when the driving is performed using the single power source of the battery 29. In other words, it is sufficient that the print speed in the power suppression mode be slower than in the high speed mode. In accordance with hits, the number of the on dots may be restricted as appropriate.

Note that, in place of the CPU 21, a micro-computer, an ASIC, a field programmable gate array (FPGA), or the like may be used as a processor. The main processing may be performed by distributed processing using a plurality of processors. The print portion 3 may be provided, for example, with another non-transitory storage medium, such as a flash memory, an HDD, or the like. It is sufficient that the non-transitory storage medium be a storage medium capable of storing information, regardless of a period of storage of the information. The non-transitory storage medium need not necessarily include a transitory storage medium (a transmission signal, for example).

The various programs may be downloaded from a server connected via a network (not shown in the drawings), for example (namely, may be transmitted as transmission signals), and may be stored in the flash memory, the HDD, or the like. In this case, it is sufficient that the various programs are stored in a non-transitory storage medium, such as an HDD or the like, provided in the server.

What is claimed is:

1. A print system configured to be driven by a plurality of power sources, the print system comprising:
- a head configured to perform printing on a medium;
- a conveyance motor configured to generate motive power to convey the medium;
- a first connector configured to connect a first power source;
- a second connector configured to connect a second power source; and
- a power supply circuit configured to supply power to the head and to the conveyance motor, wherein
- when the first power source is connected to the first connector and the second power source is connected to the second connector, the power supply circuit simultaneously supplies at least some of a first power to the head and at least some of a second power to the conveyance motor, the first power being a power of the first power source, and the second power being a power of the second power source.

2. The print system according to claim 1, wherein
- when the first power source is connected to the first connector and the second power source is connected to the second connector, the power supply circuit supplies the at least some of the first power to a first portion of the head and to the conveyance motor, and supplies the at least some of the second power to a second portion of the head, the second portion of the head being different from the first portion of the head.

3. The print system according to claim 1, wherein the print system, in a further operational arrangement, being configured such that:
- when the first power source is connected to the first connector and the second power source is not connected to the second connector, the power supply circuit supplies the at least some of the first power to the head and the conveyance motor.

4. The print system according to claim 1, wherein the print system, in a further operational arrangement, being configured such that:
- when the second power source is connected to the second connector and the first power source is not connected to the first connector, the power supply circuit supplies the at least some of the second power to the head and the conveyance motor.

5. The print system according to claim 1, wherein
the first power is larger than the second power.

6. The print system according to claim 1, wherein
the first power source is a battery, and
the second power source is an AC adaptor.

7. The print system according to claim 1, further comprising:
- a third connector configured to connect a third power source, wherein
- when the first power source is connected to the first connector and the third power source is connected to the third connector, the power supply circuit supplies the at least some of the first power to the head, and supplies at least some of a third power to the conveyance motor, the third power being a power of the third power source.

8. The print system according to claim 7, wherein
- when the first power source is connected to the first connector, the second power source is connected to the second connector, and the third power source is connected to the third connector, the power supply circuit supplies the at least some of the first power to the head, and supplies the at least some of the second power to the conveyance motor.

9. The print system according to claim 7, wherein
the third power source is a USB power supply.

10. The print system according to claim 1, wherein
the power supply circuit includes
- a first wiring line electrically connected to the second connector and the head,
- a first switch configured to switch the first wiring line to a conduction state and a non-conduction state,
- a second wiring line electrically connected to the second connector and the conveyance motor,
- a second switch configured to switch the second wiring line to a conduction state and to a non-conduction state,
- a third wiring line electrically connected to the first wiring line, between the first switch and the head, and electrically connected to the second wiring line, between the second switch and the conveyance motor,
- a third switch configured to switch the third wiring line to a conduction state and to a non-conduction state, and
- a fourth wiring line electrically connected to the first connector and electrically connected to the first wiring line, between the first switch and the head.

11. The print system according to claim 10, further comprising:
- a third connector configured to connect a third power source, wherein
- the power supply circuit includes a fifth wiring line electronically connected to the third connector and electrically connected to the first wiring line, between the second connector and the first switch.

12. The print system according to claim 11, wherein
the power supply circuit includes
- a first bleeder circuit connected to the first wiring line, the fifth wiring line, and a ground, and configured to discharge an electric charge generated in the third connector in which the third connector is not connected to the third power source,
- a first bleeder resistor connected to the first bleeder circuit and connected to the fifth wiring line,
- a second bleeder circuit connected to the first wiring line, the fifth wiring line, and the ground, and configured to discharge an electric charge generated in the second connector in which the second connector, in a further operational arrangement, is not connected to the second power source, and
  - a second bleeder resistor connected to the second bleeder circuit and connected to the first wiring line.

13. The print system according to claim 1, further comprising:
- a processor; and
- a memory storing computer-readable instructions that, when executed by the processor, perform process comprising:
  - performing detection processing of detecting whether a usable power source is connected, by detecting a voltage of each of the plurality of the power sources.

14. The print system according to claim 1, further comprising:
- a display portion configured to display information indicating which of the power sources, of the plurality of the power sources, is being used.

15. The print system according to claim 14, wherein the display portion is a plurality of LEDs corresponding to the plurality of the power sources, and the plurality of LEDs is configured to be illuminated in correspondence to the power source being used.

16. The print system according to claim 14, wherein the display portion is an LED configured to be illuminated in a plurality of colors, and the LED is illuminated in a color, of the plurality of the colors, corresponding to the power source being used.

17. The print system according to claim 1, further comprising:

a printer including at least the head, the conveyance motor, the power supply circuit, the first connector, and the second connector;

a medium feed device configured to feed the medium to the printer; and a transmission portion configured to transmit the power from the power supply circuit of the printer to the medium feed device, wherein when the first power source is connected to the first connector and the second power source is connected to the second connector, the power supply circuit supplies the at least some of the first power to the head, and supplies the at least some of the second power to the conveyance motor, and to the medium feed device via the transmission portion.

18. The print system according to claim 1, further comprising:

a printer including at least the head, the conveyance motor, the first connector, and the power supply circuit; and a medium feed device including the second connector, and configured to feed the medium to the printer, wherein when the first power source is connected to the first connector, the power supply circuit supplies the at least some of the first power to the head and the conveyance motor, and when the second power source is connected to the second connector, the second power source supplies the at least some of the second power to the medium feed device.

19. The print system according to claim 1, further comprising:

a processor; and a memory storing computer-readable instructions that, when executed by the processor, perform processes comprising:

performing acquisition processing of acquiring a temperature of the first power source; and performing decision processing of deciding a print speed based on the temperature of the first power source acquired by the acquisition processing, the print speed being a speed of performing the printing on the medium, wherein the decision processing includes decreasing the print speed in response to the temperature, acquired by the acquisition processing, of the first power source becoming low, and deciding the print speed to cause the print speed when the first power source is connected to the first connector and the second power source is connected to the second connector to be equal to or faster than the print speed when the first power source is connected to the first connector and the second power source, in a further operational arrangement, is not connected to the second connector.

20. The print system according to claim 1, further comprising:

a processor; and a memory storing computer-readable instructions that, when executed by the processor, perform processes comprising:

performing first determination processing of determining, when the first power source is connected to the first connector and the second power source is connected to the second connector, whether to execute a power suppression mode suppressing the at least some of the first power supplied by the first power source; and performing restriction processing of restricting a number of on dots, heated simultaneously, among a plurality of heating elements of the head, when the first determination processing determines to execute the power suppression mode.

21. The print system according to claim 1, further comprising:

a processor; and a memory storing computer-readable instructions that, when executed by the processor, perform processes comprising:

performing second determination processing of determining, based on conditions to use the plurality of the power sources, usable power source of the plurality of the power sources; and performing power supply processing of supplying, to the head and the conveyance motor, power of the usable power source determined by the second determination processing, wherein the power supply processing includes supplying, when the second determination processing determines that only one of the first power source and the second power source is the usable power source, the power of the one power source to the head and the conveyance motor, and supplying, when the second determination processing determines that both the first power source and the second power source are usable, the at least some of the first power to the head, and the at least some of the second power to the conveyance motor.

22. The print system according to claim 21, wherein the computer-readable instructions, when executed by the processor, further instruct the print system to perform process comprising:

performing restricting processing of restricting the print system from printing when the second determination processing determines that the usable power source is not present, of the plurality of the power sources.

23. The print system according to claim 21, wherein the second determination processing includes determining the first power source to be the usable power source when a voltage output by the first power source is equal to or greater than a first threshold value, and determining the second power source to be the usable power source when a voltage output by the second power source is equal to or greater than a second threshold value.

24. The print system according to claim 21, wherein
the first power source is a battery, and
the second determination processing includes determining the battery to be the usable power source when a voltage output by the battery is equal to or greater than a first threshold value.

25. The print system according to claim 24, further comprising:
a third connector configured to connect a third power source, wherein
the second determination processing includes determining the battery to be unusable when the voltage output by the battery is smaller than the first threshold value, and
the power supply processing includes supplying, when the second determination processing determines the battery to be the unusable power source and determines the second power source and the third power source to be the usable power sources, the at least some of the second power to the head and the conveyance motor, and at least some of a third power to the battery, and the third power being a power of the third power source.

26. The print system according to claim 25, wherein
the second determination processing includes determining, when a voltage output by the third power source is equal to or greater than a third threshold value, the third power source to be usable.

27. The print system according to claim 24, wherein
the first threshold value includes a fourth threshold value and a fifth threshold value greater than the fourth threshold value, and
the second determination processing includes
determining, when, of the plurality of the power supplies, the power source other than the battery is not usable, and the voltage output from the battery is equal to or greater than the fourth threshold value, the battery to be the usable power source, and
determining, when, of the plurality of the power sources, the power source other than the battery is usable, and the voltage output from the battery is equal to or greater than the fifth threshold value, the battery to be the usable power source.

28. The print system according to claim 21, further comprising:
a sensor configured to detect a temperature of each of the plurality of the power sources, wherein
the second determination processing includes determining the power source to be the usable power source when the temperature, of the plurality of the power sources detected by the sensor, is within a predetermined temperature range.

29. The print system according to claim 21, wherein
the second determination processing includes determining, of the plurality of the power sources, the power source to be usable when the power source having a current larger than a current required to drive the head and a current required to drive the conveyance motor.

30. The print system according to claim 29, further comprising:
a third connector configured to connect a third power source, wherein
the first power source is a battery,
the third power source is a USB power supply, and
the power supply processing includes
supplying, when a current suppliable by the USB power supply is greater than the current required to drive the conveyance motor, and a voltage output by the USB power supply is equal to or greater than a sixth threshold value, the power of the USB power supply to the conveyance motor, and the first power of the battery to the head, and
supplying, when the current suppliable by the USB power supply is smaller than the current required to drive the conveyance motor, and the voltage output by the USB power supply is smaller than the sixth threshold value, the first power of the battery to the head and the conveyance motor.

* * * * *